US012806869B2

(12) United States Patent
Hirabayashi et al.

(10) Patent No.: US 12,806,869 B2
(45) Date of Patent: Nov. 24, 2026

(54) FIBER WIDTH ADJUSTMENT DEVICE AND METHOD OF MOLDING COMPOSITE MATERIAL

(71) Applicant: SUBARU CORPORATION, Tokyo (JP)

(72) Inventors: Daisuke Hirabayashi, Tokyo (JP); Tomoyoshi Kuniya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 64 days.

(21) Appl. No.: 18/968,537

(22) Filed: Dec. 4, 2024

(65) Prior Publication Data

US 2025/0205979 A1 Jun. 26, 2025

(30) Foreign Application Priority Data

Dec. 25, 2023 (JP) ................................ 2023-218698

(51) Int. Cl.
*B29C 70/54* (2006.01)
*B29K 105/08* (2006.01)

(52) U.S. Cl.
CPC .... *B29C 70/543* (2013.01); *B29K 2105/0881* (2013.01)

(58) Field of Classification Search
CPC ..... B29C 70/543; B29C 70/388; B29C 70/54; B29C 70/384; B29C 2793/0063; B29K 2105/0881
See application file for complete search history.

(56) References Cited

U.S. PATENT DOCUMENTS

| | | | |
|---|---|---|---|
| 11,548,241 B2 | 1/2023 | Yasukochi et al. | |
| 11,597,168 B2 | 3/2023 | Kawabe et al. | |
| 11,679,570 B2 | 6/2023 | Hirabayashi et al. | |
| 11,919,257 B2 | 3/2024 | Hirabayashi et al. | |
| 2022/0072813 A1* | 3/2022 | Hirabayashi | B29C 70/388 |

FOREIGN PATENT DOCUMENTS

| | | | | |
|---|---|---|---|---|
| EP | 4049836 A1 | 8/2022 | |
| EP | 4450264 A1 * | 10/2024 | B29C 70/16 |
| JP | S52-071575 A | 6/1977 | |
| JP | 2019-151726 A | 9/2019 | |
| JP | 2020-059144 A | 4/2020 | |
| JP | 2020-059145 A | 4/2020 | |
| JP | 2020-093454 A | 6/2020 | |
| JP | 2022-046379 A | 3/2022 | |
| JP | 2022-130133 A | 9/2022 | |
| WO | 2011/116191 A1 | 9/2011 | |
| WO | WO-2016116834 A1 * | 7/2016 | B29C 66/876 |

OTHER PUBLICATIONS

Extended European Search Report dated May 26, 2025, issued in corresponding European Patent Application 24218760.7, 7 pages.

* cited by examiner

*Primary Examiner* — Daniel Mcnally
(74) *Attorney, Agent, or Firm* — Rimon P.C.

(57) ABSTRACT

A fiber width adjustment device is for adjusting a width of a tape made of fibers before or after being impregnated with resin. The tape is a material for a fiber reinforced plastic. The fiber width adjustment device includes a twisting mechanism and a pressure unit. The twisting mechanism is configured to overlap the tape in a width direction of the tape by twisting the tape. The pressure unit is configured to produce a sheeted tape, having an adjusted width, by pressing the overlapped tape in a thickness direction of the overlapped tape.

10 Claims, 17 Drawing Sheets

FIBER WIDTH ADJUSTMENT DEVICE AND METHOD OF MOLDING COMPOSITE MATERIAL

CROSS REFERENCES TO RELATED APPLICATIONS

This application is based upon and claims the benefit of priority from Japanese Patent Application No. 2023-218698, filed on Dec. 25, 2023; the entire contents of which are incorporated herein by reference.

FIELD

Implementations described herein relate generally to a fiber width adjustment device and a method of molding a composite material.

BACKGROUND

In order to mold an FRP (fiber reinforced plastic), such as a GFRP (glass fiber reinforced plastic) or a CFRP (carbon fiber reinforced plastic), which is also referred to as a composite material, it is necessary to laminate prepreg sheets consisting of fiber sheets impregnated with uncured resin, and subsequently cure the resin. Alternatively, it is necessary to laminate fiber sheets which have not been impregnated with resin, and subsequently impregnate the laminated fiber sheets with the resin and cure the resin. The method of molding an FRP of impregnating fibers with resin after laminating the fibers is referred to as an RTM (Resin Transfer Molding) method.

In recent years, an AFP (Automated Fiber Placement) apparatus for automatically laminating prepreg tapes or fiber tapes is commercially available, and therefore a prepreg tape as well as a fiber tape, which has not been impregnated with resin, called a dry tape is also commercially available for lamination with an AFP apparatus.

A laminate of fibers shaped to match a shape of an FRP to be molded is called a preform. Among preforms, a laminate of fibers before being impregnated with resin, which is produced in order to mold an FRP by the RTM method, is called a dry preform.

In order to mold an FRP having a more complicated shape, it is necessary to allow producing a preform having a corresponding complicated shape. That is, it is necessary to produce a preform in which prepreg tapes or dry tapes, which are material of an FRP, are laminated according to a shape of the FRP. Accordingly, there has been proposed a width adjustment device that changes a width of a prepreg tape or a dry tape by making the prepreg tape or the dry tape pass through a path whose width gradually decreases (for example, refer to international publication WO 2011/116191 A and Japanese Patent Application Publication JP 2020-093454 A).

In addition, a device that can dispose prepreg tapes widthwise and change the amount of overlap (for example, refer to Japanese Patent Application Publication JP 2020-059145 A and Japanese Patent Application Publication JP 2022-046379 A), a device that changes the widths of prepreg tapes and then disposes them at a desired tape pitch (for example, refer to Japanese Patent Application Publication JP 2022-130133 A), and a device having a slit roll to make partial and intermittent cuts in a wide prepreg tape so that the prepreg tape can be easily deformed (for example, refer to Japanese Patent Application Publication JP 2019-151726 A) are also proposed.

An object of the present invention is to allow stably adjusting a width of a prepreg tape or a dry tape for FRP molding.

SUMMARY

In general, according to one implementation, a fiber width adjustment device is for adjusting a width of a tape made of fibers before or after being impregnated with resin. The tape is a material for a fiber reinforced plastic. The fiber width adjustment device includes a twisting mechanism and a pressure unit. The twisting mechanism is configured to overlap the tape in a width direction of the tape by twisting the tape. The pressure unit is configured to produce a sheeted tape, having an adjusted width, by pressing the overlapped tape in a thickness direction of the overlapped tape.

Further, according to one implementation, a method of molding a composite material includes: using the above-mentioned fiber width adjustment device for producing the sheeted tape having the adjusted width; laminating the sheeted tape; and producing the fiber reinforced plastic by curing the resin included in the sheeted tape which has been laminated.

DETAILED DESCRIPTION

A fiber width adjustment device and a method of molding a composite material according to implementations of the present invention will be described with reference to the accompanying drawings.

(Structure and Function of Fiber Width Adjustment Device)

Figure 1:
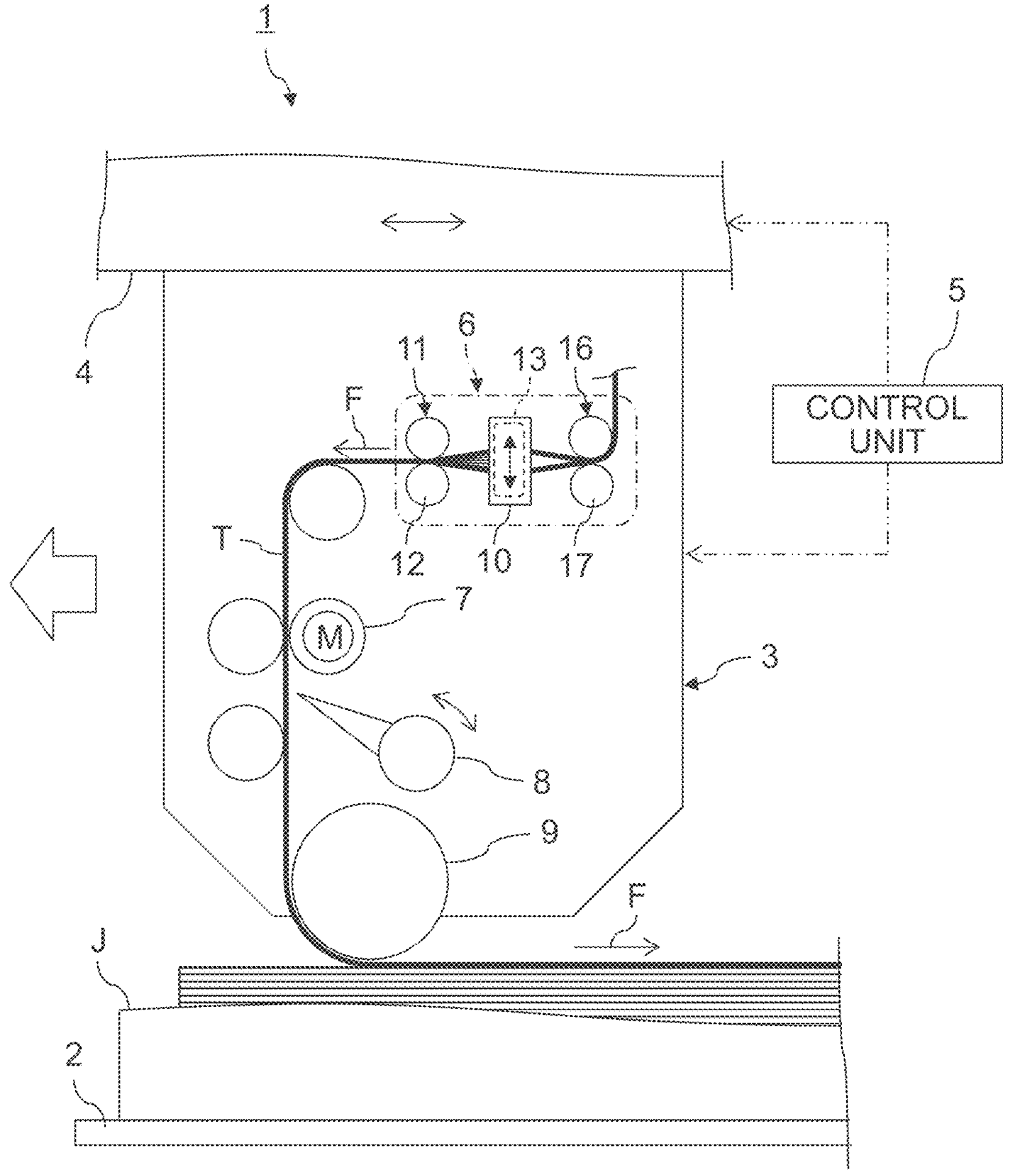
FIG. 1 shows an example of a configuration of an AFP apparatus having a fiber width adjustment device according to an implementation of the present invention.

FIG. 1 shows an example of a configuration of an AFP apparatus having a fiber width adjustment device according to an implementation of the present invention.

An AFP apparatus 1 produces a laminated body of prepreg tapes T, which are material of an FRP, by laminating the prepreg tapes T. Prepreg is sheet like fibers impregnated with thermoplastic resin or uncured thermosetting resin. The prepreg tape T is a tape-shaped prepreg. The AFP apparatus 1 can be composed of a table 2, a lamination head 3 for feeding the prepreg tape T toward the table 2, a feeding mechanism 4 and a control unit 5 which integrally controls elements of the AFP apparatus 1.

The table 2 is a pedestal for laminating the prepreg tapes T. Although the prepreg tapes T may be directly laminated on the table 2, it is practical to place a lamination jig J, such as a shaping mold, on the table 2 so that the prepreg tapes T may be laminated on the lamination jig J, from a viewpoint of shaping a laminated body of the prepregs and cleaning. Therefore, the prepreg tapes T can be laminated on the table 2 directly or indirectly through the lamination jig J.

The lamination head 3 can include a fiber width adjustment device 6 of the prepreg tape T as well as a feed roller 7, a cutter 8 and a compaction roller 9. The fiber width adjustment device 6 is a device for adjusting the width of the prepreg tape T supplied as a material from a bobbin or the like to feed out the prepreg tape T.

The feed roller 7 is a powered roller rotated by a motor. The feed roller 7 is provided to feed the prepreg tape T, of which the width has been adjusted by the fiber width adjustment device 6, toward the compaction roller 9. The motor of the feed roller 7 can be controlled by the control unit 5. Note that, a belt conveyor or a belt conveyor with a suction chuck disclosed in Japanese Patent Application Publication JP 2023-111757 A may be used without the feed roller 7 or in addition to the feed roller 7.

The cutter 8 is a tool for cutting the prepreg tape T when the prepreg tape T has been laminated. The operation of the cutter 8 can be controlled by the control unit 5.

The compaction roller 9 is a cylindrical roller for feeding out the prepreg tape T toward the table 2 while applying pressure to the prepreg tape T in the thickness direction of the prepreg tape T. The prepreg tape T in the first ply is pressed on the lamination jig J by the compaction roller 9, and each prepreg tape T in the second and subsequent plies is pressed on the lower laminated prepreg tape T adjacent in the thickness direction.

The feeding mechanism 4 moves the lamination head 3 relative to the table 2 so that the prepreg tape T can be fed out toward the table 2 side while changing a lamination position. A feeding direction F of the prepreg tape T toward the table 2 side is opposite to a moving direction of the lamination head 3. The feeding mechanism 4 may be configured to rotate the lamination head 3, in addition to linear movement of the lamination head 3 in orthogonal three-axis directions. The compaction roller 9 may be moved relative to the lamination head 3 without moving the housing itself of the lamination head 3.

For example, the feeding mechanism 4 for linearly moving the lamination head 3 and/or the table 2 can be composed of at least one motor, such as an electric motor, a hydraulic motor or a pneumatic motor, circuitry, such as electric circuitry, hydraulic circuitry or pneumatic circuitry, for rotating the at least one motor, and at least one desired machine element, such as wheels, a rack-and-pinion which is one kind of gears, at least one ball screw, or at least one crawler, for converting rotational movement of the at least one motor into linear movement. Alternatively, the feeding mechanism 4 may also be composed of at least one piston and hydraulic circuitry without using any motor.

When the feeding mechanism 4 includes a rotation mechanism for rotating the lamination head 3, the rotation mechanism can be composed of, e.g., at least one motor, such as an electric motor, a hydraulic motor or a pneumatic motor, and desired machine elements including a rotating shaft which rotates by power of the at least one motor. An articulated robot may be used as the mechanism for rotating the lamination head 3. When the lamination head 3 is attached as an end effector to an arm of an articulated robot, the lamination head 3 is also rotated and linearly moved by a link mechanism or the like including a shaft rotated by at least one motor.

After the end of the prepreg tape T reach the compaction roller 9, the prepreg tape T can be fed out by the pressure applied from the compaction roller 9 even without applying tension to the prepreg tape T by the powered feed roller 7 as long as the lamination head 3 is relatively moved by the feeding mechanism 4. Accordingly, the feed roller 7 may be made retractable from the prepreg tape T by a cylinder mechanism or the like. Conversely, in order to secure the tension of the prepreg tape T appropriately, the feed roller 7 may be brought into contact with the prepreg tape T and the prepreg tape T may be slid on the feed roller 7.

Next, an example of a detailed structure of the fiber width adjustment device 6 will be described.

Figure 2:
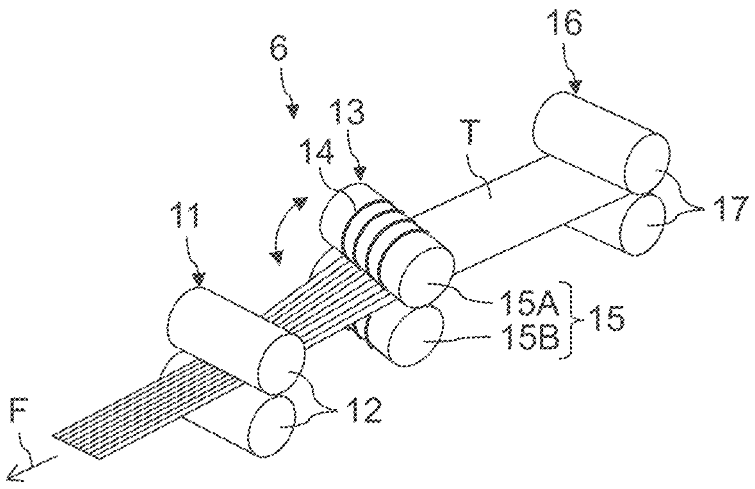
FIG. 2 is a simplified perspective view for explaining the mechanism of the fiber width adjustment device shown in FIG. 1.

FIG. 2 is a simplified perspective view for explaining the mechanism of the fiber width adjustment device 6 shown in FIG. 1.

The fiber width adjustment device 6 is a device for changing the width of a prepreg tape T fed from a bobbin or the like. That is, the fiber width adjustment device 6 is a device for producing a prepreg tape T whose width is adjusted.

Although FIG. 1 shows an example in which one prepreg tape T supplied from a single bobbin is fed from the lamination head 3 onto the table 2, a plurality of prepreg tapes T supplied from multiple bobbins may also be fed from the lamination head 3. In this case, the lamination head 3 is provided with the fiber width adjustment devices 6 whose number is equal to the number of the prepreg tapes T supplied from the bobbins. In addition, a tape arranging device that arranges in the width direction the prepreg tapes T whose widths have been adjusted by the fiber width adjustment devices 6 respectively is disposed after the fiber width adjustment devices 6. Specific examples of the tape arranging device include the device disclosed in Japanese Patent Application Publication JP 2022-130133 A and the device disclosed in Japanese Patent Application Publication JP 2023-106261 A.

As shown in FIG. 1, the fiber width adjustment device 6 has a twisting mechanism 10 and a pressure unit 11. The twisting mechanism 10 is configured to overlap the prepreg tape T in the width direction of the prepreg tape T by twisting the prepreg tape T. The pressure unit 11 is configured to produce a sheeted prepreg tape T having an adjusted width by pressing the overlapped prepreg tape T in the thickness direction of the prepreg tape T to form a sheet.

As shown in FIGS. 1 and 2, the pressure unit 11 can be composed of a pair of cylindrical pressure rollers 12 that sandwiches the prepreg tape T and apply pressure to the prepreg tape T in the thickness direction. The interval between the pressure rollers 12 when the pressure is applied to the prepreg tape T is constant. When any of the pressure rollers 12 is not to be retracted from the prepreg tape T, a mechanism for moving at least one of the pressure rollers 12 is not essential. Any of the pressure rollers 12 does not necessarily need to have rotational power since the prepreg tape T can be fed by the pressure applied from the powered feed roller 7 or the compaction roller 9 as described above.

Note that, one or both of the pressure rollers 12 may be replaced with a non-rotating block or the like as long as it is possible to apply the necessary pressure to the prepreg tape T in the thickness direction of the prepreg tape T. That is, the pressure unit 11 may be composed of elements other than the pair of the pressure rollers 12.

In addition to the twisting mechanism 10 and the pressure unit 11 shown in FIG. 1, the fiber width adjustment device 6 includes a roller-type cutter unit 13 as shown in FIG. 2. The roller-type cutter unit 13 is disposed before the pressure unit 11 which is composed of the pair of the pressure rollers 12 or the like. The roller-type cutter unit 13 has cutters 14 that divide a single prepreg tape T into partial prepreg tapes T by making cuts, of which length direction is the length direction of the single prepreg tape T, in the single prepreg tape T.

In the example shown in FIG. 2, the cutter unit 13 is composed of a pair of cutter rollers 15 each having ring-shaped cutters 14 formed thereon. The pair of the cutter rollers 15 is disposed before the pair of the pressure rollers 12 toward the feeding direction F of the prepreg tape T.

On the other hand, the twisting mechanism 10 can be a rotating mechanism that rotates the cutter unit 13. That is, the prepreg tape T can be indirectly twisted at a desired angle by rotating the cutter unit 13 with the twisting mechanism 10.

Accordingly, the prepreg tapes T divided in the width direction by the cutter unit 13 can be partially overlapped in the width direction of the divided prepreg tapes T by twisting the divided prepreg tapes T with the twisting mechanism 10. That is, each two prepreg tapes T adjacent in the width direction can be partially overlapped with each other.

Therefore, the prepreg tapes T of which each adjacent two prepreg tapes T are partially overlapped in the width direction are pressed in the thickness direction of the prepreg tapes T by the pressure unit 11 disposed after the cutter unit 13. Thereby, the overlapped prepreg tapes T are integrated. That is, the prepreg tapes T that were once divided by the cutter unit 13 can be reintegrated by the tack of prepreg and the like. Thereby, a prepreg tape T whose width has been adjusted can be produced.

Note that, the length direction of the fibers included in the prepreg tape T is the length direction of the prepreg tape T. Accordingly, even when the cutter unit 13 makes cuts in the prepreg tape T, the fibers are hardly cut in the length direction, but the fibers that are bundled together while being impregnated with the resin are merely split. Therefore, even when an FRP is molded using the prepreg tape T, having the adjusted width, as a material, non-negligible deterioration in strength does not arise.

In order to twist the prepreg tape T together with the cutter unit 13 by the twisting mechanism 10, it is necessary to hold the prepreg tape T on both the front and rear sides of the cutter unit 13 so that the thickness direction of the prepreg tape T may not change.

Accordingly, a tension roller unit 16 is disposed before the cutter unit 13 as exemplified in FIGS. 1 and 2. The tension roller unit 16 is for keeping the tension of the prepreg tape T and pressing the prepreg tape T so that the thickness direction does not change. In the example shown in FIGS. 1 and 2, the tension roller unit 16 also has a pair of cylindrical rollers 17 sandwiching the prepreg tape T therebetween.

Figure 3:
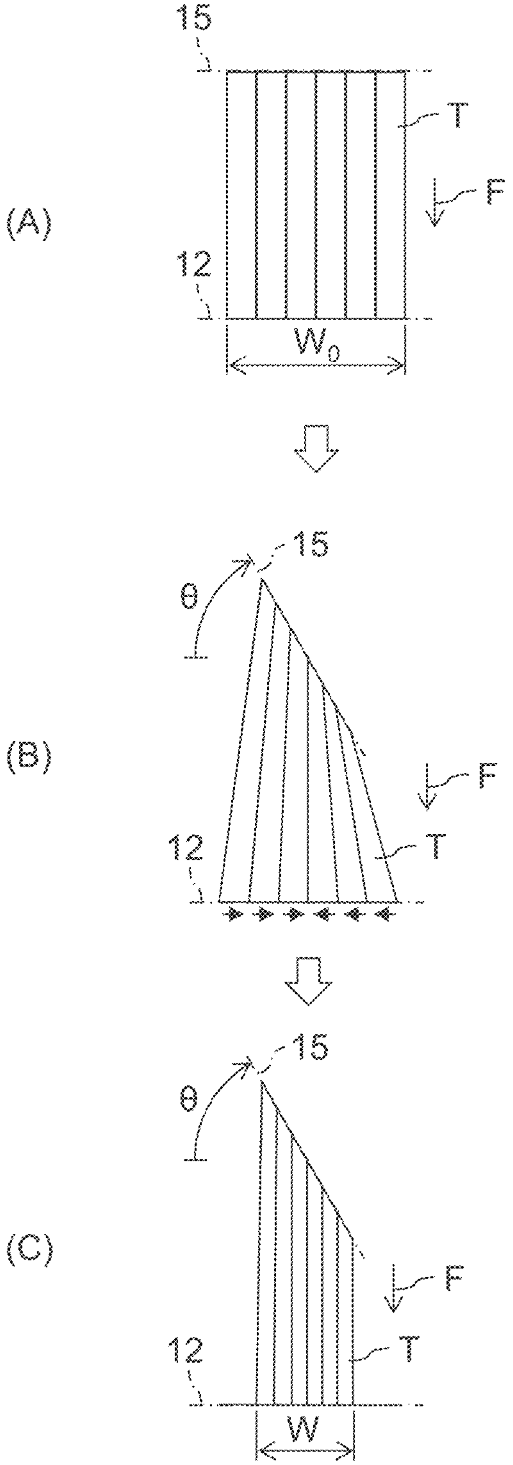
FIG. 3 shows an example of changing the width of the prepreg tapes by the fiber width adjustment device shown in FIG. 2.
Figure 4:
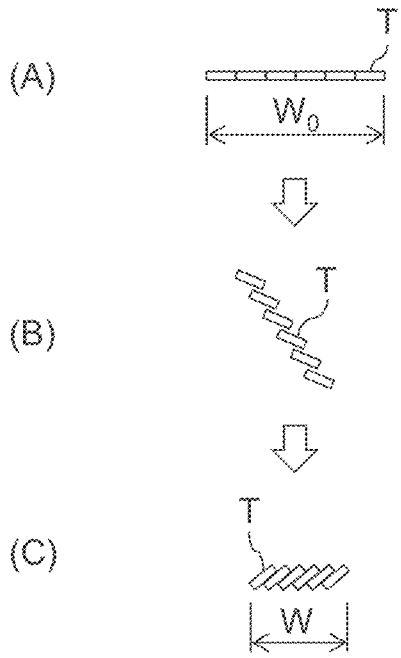
FIG. 4 shows the change in the cross section of the prepreg tapes when the width of the prepreg tapes is changed as shown in FIG. 3.
Figure 5:
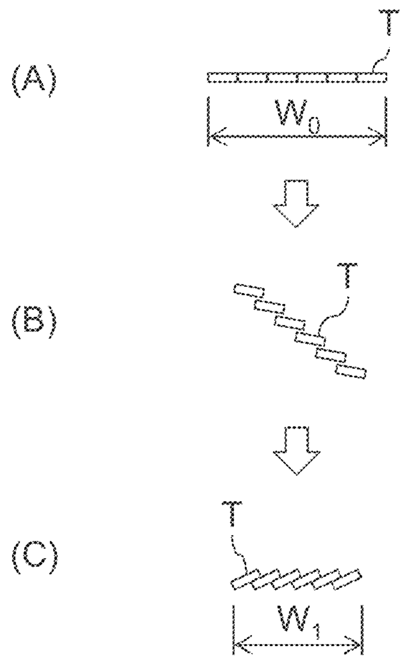
FIG. 5 shows the change in the cross section of the prepreg tapes when the width of the prepreg tapes is changed to a width wider than the width shown in FIG. 4 by the fiber width adjustment device shown in FIG. 2.

FIG. 3 shows an example of changing the width of the prepreg tapes T by the fiber width adjustment device 6 shown in FIG. 2. FIG. 4 shows the change in the cross section of the prepreg tapes T when the width of the prepreg tapes T is changed as shown in FIG. 3. FIG. 5 shows the change in the cross section of the prepreg tapes T when the width of the prepreg tapes T is changed to a width wider than the width shown in FIG. 4 by the fiber width adjustment device 6 shown in FIG. 2.

FIGS. 3 to 5 show an example in which the five cutters 14 are used to make cuts at five locations in one prepreg tape T, thereby dividing the prepreg tape T into six partial prepreg tapes T. In FIG. 3, the upper dotted line indicates the position of the prepreg tape T when the prepreg tape T passes through the cutter rollers 15 of the cutter unit 13, and the lower dotted line indicates the position of the prepreg tape T when the prepreg tape T passes through the pressure rollers 12 of the pressure unit 11.

Before the cutter unit 13 is rotated by the twisting mechanism 10, the rotation axes of the pair of the pressure rollers 12 of the pressure unit 11 and the pair of the cutter rollers 15 of the cutter unit 13 are parallel to each other, as shown in FIG. 3(A). That is, the rotation angle of the rotation shafts of the cutter rollers 15 by the twisting mechanism 10 and the inclination angle of the rotation shafts of the cutter rollers 15 with respect to the rotation shafts of the pressure rollers 12 are both 0 degrees.

Therefore, the prepreg tape T is fed in the feeding direction F from the cutter rollers 15 toward the pressure rollers 12 without being twisted. That is, the prepreg tape T passes between the pair of the cutter rollers 15 and between the pair of the pressure rollers 12 without changing the thickness direction of the prepreg tape T.

Accordingly, even when the single prepreg tape T is sandwiched between the cutter rollers 15 and cut in the width direction to be divided into the partial prepreg tapes T, the divided partial prepreg tapes T pass through the pressure rollers 12 without overlapping in the width direction. As a result, the divided prepreg tapes T are fed out of the fiber width adjustment device 6 without changing the overall width thereof.

In contrast, when the cutter unit 13 including the cutter rollers 15 is rotated by an angle θ using the twisting mechanism 10 as shown in FIG. 3(B), the inclination angle of the rotation axes of the cutter rollers 15 of the cutter unit 13, sandwiching the prepreg tape T therebetween, relative to the rotation axes of the pressure rollers 12 becomes the angle θ. Accordingly, the prepreg tapes T cut in the width direction by the cutter rollers 15 are fed in the feeding direction F toward the pressure rollers 12 with their thickness directions inclined at the angle θ.

On the other hand, the rotation axes of the pressure rollers 12 that sandwich the prepreg tapes T cut in the width direction do not change. Accordingly, the prepreg tapes T cut in the width direction are twisted between the cutter rollers 15 and the pressure rollers 12.

The blades of the ring-shaped cutters 14 protrude from the cylindrical surface of each of the cutter rollers 15. Accordingly, when the prepreg tape T passes through the cutter rollers 15 before and after cutting, the prepreg tape T does not move in the width direction by a non-negligible amount. In contrast, the prepreg tapes T cut in the width direction can each move in the width direction on the cylindrical surface of each of the pressure rollers 12 since the cylindrical surface of each of the pressure rollers 12 is smooth.

As a result, the prepreg tapes T cut in the width direction move on the surfaces of the pressure rollers 12 and overlap each other in the width direction, as shown in FIG. 3(C). That is, although the total width of the prepreg tapes T immediately after being cut by the cutter rollers 15 is the same as the width $W_0$ of the prepreg tape T before being cut, as shown in FIG. 4(A), the prepreg tapes T spaced apart from each other gradually overlap each other in the width direction, as shown in FIG. 4(B), by being twisted at different spatial positions between the cutter rollers 15 and the pressure rollers 12, and eventually, the amount of overlap in the width direction becomes the maximum on the surfaces of the pressure rollers 12, as shown in FIG. 4(C).

Then, the width-adjusted prepreg tape T that can be handled as a single sheet of prepreg tape T can be obtained by applying pressure in the thickness direction with the pressure rollers 12 to the partial prepreg tapes T overlapping in the width direction, as shown in FIG. 3(C) and in FIG. 4(C). That is, when the resin with which the partial prepreg tapes T are impregnated is uncured thermosetting resin, the partial prepreg tapes T cut by the cutter rollers 15 can be integrated with the tack of the resin.

On the other hand, when the resin with which the partial prepreg tapes T are impregnated is thermoplastic resin, the partial prepreg tapes T cut by the cutter rollers 15 can be integrated by once heating and melting the resin when or immediately before pressure is applied in the thickness direction by the pressure rollers 12, and then curing the resin again by air cooling or the like after the pressurization. Therefore, when the prepreg tape T whose matrix is thermoplastic resin is cut by the cutter rollers 15, the partial prepreg tapes T cut by the cutter rollers 15 are heated by heating devices consisting of the pressure rollers 12 or a heating device disposed just before the pressure rollers 12.

The total width W of the overlapped prepreg tapes T sandwiched between the pressure rollers 12 is theoretically the length derived by projecting the width $W_0$ of the uncut prepreg tape T tilted by the angle θ onto the rotation axis of one of the pressure rollers 12 although the amount of movement of each partial prepreg tape T relative to the pressure rollers 12 may practically vary due to factors including the adhesive strength of each partial prepreg tape T and the frictional force between each partial prepreg tape T and each of the pressure rollers 12. That is, as long as errors are ignored, the adjusted width W of the prepreg tape T is $W_0 \cos\theta$ ($W=W_0 \cos\theta$) wherein $W_0$ is the width of the prepreg tape T before the adjustment and θ is the angle by which the cutter unit 13 and the prepreg tape T are rotated by the twisting mechanism 10.

Therefore, controlling the angle θ by which the cutter unit 13 and the prepreg tape T are rotated by the twisting mechanism 10 allows narrowing the prepreg tape T having the width $W_0$ supplied from a bobbin or the like down to a desired width W. That is, the width $W_0$ of the prepreg tape T can be adjusted to the width W corresponding to the rotation angle θ of the cutter unit 13 and the prepreg tape T.

For example, when the rotation angle θ of the cutter unit 13 and the prepreg tape T is set to 60 degrees, the width W of the prepreg tape T can be theoretically reduced to ½ of the original width $W_0$. Alternatively, when the cutter unit 13 and the prepreg tape T is rotated as shown in FIGS. 5(A), (B), and (C) by an angle smaller than the angle θ shown in FIGS. 3 and 4, a prepreg tape T having a width $W_1$ wider than the width W shown in FIGS. 3 and 4 can be produced by the fiber width adjustment device 6.

Note that, each of the two prepreg tapes T outermost in the width direction out of the cut prepreg tapes T is adjacent to only the single prepreg tape T on one side. Therefore, each of the two prepreg tapes T outermost in the width direction has a portion that overlaps with no adjacent prepreg tape T. On the other hand, each of the other prepreg tapes T, which are not outermost in the width direction, out of the cut prepreg tapes T overlaps with the two prepreg tapes T on both sides.

When the rotation angle θ of the cutter unit 13 and the prepreg tape T is brought closer to 60 degrees to make the width W of the prepreg tape T closer to ½ of the original width $W_0$, portions where the three cut prepreg tapes T overlap in the width direction arise, or the cut prepreg tapes T overlap with each other in a state where the thickness direction of each prepreg tape T is slanted to the thickness direction of the integrated prepreg tape T as shown in FIG. 4(C) since the two prepreg tapes T outermost after the cutting partially overlaps with no other prepreg tape T.

Next, an example of a detailed structure of the cutter unit 13 shown in FIG. 2 will be described.

Figure 6:
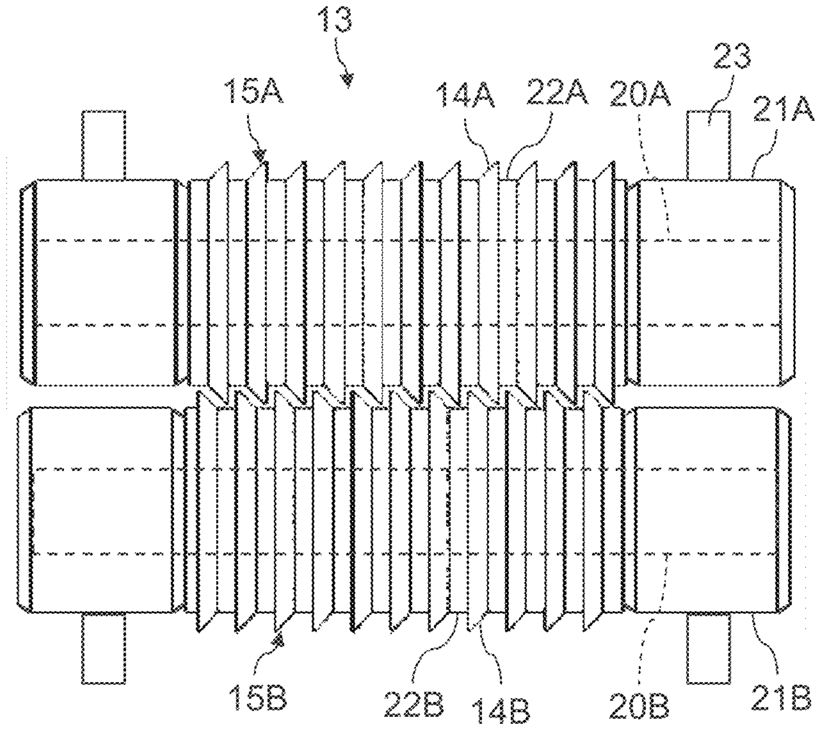
FIG. 6 is a front view showing an example of a detailed structure of the cutter unit composed of the pair of the cutter rollers shown in FIG. 2.
Figure 7:
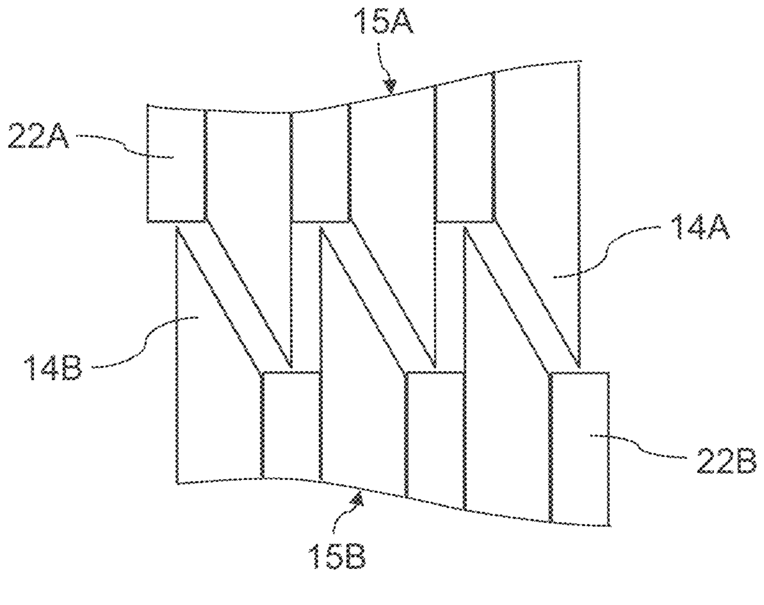
FIG. 7 is a partially enlarged view of the vicinity of the blade edges of the pair of the cutter rollers shown in FIG. 6.

FIG. 6 is a front view showing an example of a detailed structure of the cutter unit 13 composed of the pair of the cutter rollers 15 shown in FIG. 2. FIG. 7 is a partially enlarged view of the vicinity of the blade edges of the pair of the cutter rollers 15 shown in FIG. 6.

As shown in FIG. 6, the cutter unit 13 can be composed of a first cutter roller 15A and a second cutter roller 15B that are disposed to sandwich the prepreg tape T therebetween so that cuts can be made in the prepreg tape T from both sides. The first cutter roller 15A has first circular cutters 14A rotatably supported by a first support shaft 20A whose axial direction is the width direction of the prepreg tape T. Similarly, the second cutter roller 15B has second circular cutters 14B rotatably supported by a second support shaft 20B whose axial direction is the width direction of the prepreg tape T.

Both end portions of the first support shaft 20A of the first cutter roller 15A are rotatably supported by first bearings 21A. The first support shaft 20A is inserted into the through holes of the first ring-shaped circular cutters 14A with a clearance fit tolerance.

Accordingly, the first support shaft 20A itself can rotate relative to the outer ring of the first bearing 21A with negligible frictional force. Further, the first circular cutters 14A are also rotatable relative to the first support shaft 20A at rotational speeds independent of each other. Thereby, each of the first circular cutters 14A can be rotated at a rotational speed corresponding to the feed speed and cutting resistance of the prepreg tape T while avoiding wear on the inner surfaces of the first circular cutters 14A due to friction between the first circular cutters 14A and the first support shaft 20A.

Similarly, both end portions of the second support shaft 20B of the second cutter roller 15B are rotatably supported by second bearings 21B. The second support shaft 20B is inserted into the through holes of the second ring-shaped circular cutters 14B with a clearance fit tolerance.

Accordingly, the second support shaft 20B itself can rotate relative to the outer ring of the second bearing 21B with negligible frictional force. Further, the second circular cutters 14B are also rotatable relative to the second support shaft 20B at rotational speeds independent of each other. Thereby, each of the second circular cutters 14B can be rotated at a rotational speed corresponding to the feed speed and cutting resistance of the prepreg tape T while avoiding wear on the inner surfaces of the second circular cutters 14B due to friction between the second circular cutters 14B and the second support shaft 20B.

In order to sandwich the prepreg tape T between the first cutter roller 15A and the second cutter roller 15B, it is necessary to position the first cutter roller 15A and the second cutter roller 15B so that the rotation axis of the first support shaft 20A of the first cutter roller 15A may be parallel to the rotation axis of the second support shaft 20B of the second cutter roller 15B. That is, it is necessary to dispose the first cutter roller 15A and the second cutter roller 15B in a relationship in which they are moved in parallel with each other.

Note that, contact between the first circular cutters 14A of the first cutter roller 15A and the second circular cutters 14B of the second cutter roller 15B causes chipping of the blades. Accordingly, it is essential that the first circular cutters 14A and the second circular cutters 14B are disposed alternately, as shown in FIG. 7. For this purpose, first spacers 22A are interposed between adjacent ones of the first circular cutters 14A. Similarly, second spacers 22B are interposed between adjacent ones of the second circular cutters 14B.

In addition, from the viewpoint of ensuring that the prepreg tape T can be cut reliably, it is important that the first circular cutters 14A of the first cutter roller 15A and the second circular cutters 14B of the second cutter roller 15B are disposed so that the first circular cutters 14A and the second circular cutters 14B may each cross the entire prepreg tape T in the thickness direction as well as that the prepreg tape T is supported from the opposite side so that the prepreg tape T may not move in the thickness direction when the first circular cutters 14A and the second circular cutters 14B are each pressed against the prepreg tape T.

Accordingly, the first circular cutters 14A and the second circular cutters 14B are disposed alternately so as to overlap each other in the radial direction, as shown in FIG. 7. In addition, the size and shape of each of the second spacers 22B are determined so that gaps non-negligible from the standpoint of reliably cutting the prepreg tape T may not be generated between the first circular cutters 14A and the second spacers 22B respectively disposed opposite to the first circular cutters 14A. Similarly, the size and shape of each of the first spacers 22A are determined so that gaps non-negligible from the standpoint of reliably cutting the prepreg tape T may not be generated between the second circular cutters 14B and the first spacers 22A respectively disposed opposite to the second circular cutters 14B.

Thereby, each of the first spacers 22A can function as a movable blade receiver that supports the prepreg tape T on the opposite surface when the prepreg tape T is cut by the second circular cutters 14B. Similarly, each of the second spacers 22B can function as a movable blade receiver that supports the prepreg tape T on the opposite surface when the prepreg tape T is cut by the first circular cutters 14A.

In this case, each of the first spacers 22A serves as a ring-shaped blade receiver having an outer diameter corresponding to the diameter of the second circular cutter 14B. On the other hand, each of the second spacers 22B also serves as a ring-shaped blade receiver having an outer diameter corresponding to the diameter of the first circular cutter 14A. Accordingly, washers that are easily available may be used as the first spacers 22A and the second spacers 22B.

From the viewpoint of uniformly cutting the prepreg tape T, it is reasonable to make the diameters of the first circular cutters 14A and the diameters of the second circular cutters 14B all the same as illustrated, which also leads to simplification of the design and production of the cutter unit 13. In this case, each of the first spacers 22A and the second spacers 22B has a ring shape with the same outer diameter and the same inner diameter.

The axial thickness of the first spacer 22A inserted between each two adjacent first circular cutters 14A and the number of the first spacers 22A may be changed. Similarly, the axial thickness of the second spacer 22B inserted between each two adjacent second circular cutters 14B and the number of the second spacers 22B may be changed.

Therefore, the number and spacing of the first circular cutters 14A and the number and spacing of the second circular cutters 14B can be changed according to the number and spacing of the cuts to be made in the prepreg tape T. That is, the first circular cutters 14A can be detachably supported by the first support shaft 20A so that a desired number of the first circular cutters 14A can be disposed at a desired interval. On the other hand, the second circular cutters 14B can be detachably supported by the second support shaft 20B so that a desired number of the second circular cutters 14B can be disposed at a desired interval.

The number and spacing of the cutters 14, consisting of the first circular cutters 14A and the second circular cutters 14B disposed alternately, can be determined according to the thickness and width $W_0$ of the uncut prepreg tape T supplied from a bobbin or the like, as well as a type and material of the prepreg tape T. Examples of the type and material of the prepreg tape T include the resin content and composition, and the presence or absence of a nonwoven fabric.

In principle, cutting the prepreg tape T into five pieces by making four incisions in the prepreg tape T from both sides using the two first circular cutters 14A and the two second circular cutters 14B allows narrowing the width of the prepreg tape T by twisting and partially overlapping the cut prepreg tapes T, as explained with reference to FIGS. 3 to 5.

Nevertheless, when the interval between the cutters 14 is too wide, the cut prepreg tapes T overlap and double in thickness intermittently and locally, which causes an uneven thickness of the prepreg tape T integrated by the pressure rollers 12. Therefore, it is preferable to make the interval between the cutters 14 as narrow as possible from the viewpoint of making the thickness of the prepreg tape T uniform after the width adjustment. Specifically, in case of cutting and overlapping the prepreg tape T having a thickness of 0.025 mm to 0.2 mm, it is considered appropriate to set the interval between the cutters 14 to not more than 0.8 mm, as a result of tests.

On the other hand, tests were conducted under a condition that the prepreg tape T having a thickness of 0.05 mm was cut using the first circular cutters 14A and the second circular cutters 14B each having a thickness of 0.3 mm. As a result, it was confirmed that when the interval between the first circular cutters 14A and the interval between the second circular cutters 14B were less than 0.5 mm, i.e., the interval between the cutters 14 was less than 0.25 mm, the resin included in the prepreg tape T might get clogged between the cutters 14, making it difficult to split the prepreg tape T.

Therefore, in case of adjusting the width of the prepreg tape T having a thickness of 0.025 mm to 0.2 mm, it is considered preferable to set the interval of the cutters 14 as narrow as possible within the range of not less than 0.25 mm and not more than 0.8 mm.

Note that, the thickness of a commercially available standard prepreg tape T is 0.2 mm to 0.8 mm, and the amount of resin contained per unit area of the standard prepreg tape T is greater than the amount of resin contained in the prepreg tape T having a thickness of less than 0.2 mm. The thicker the prepreg tape T is, the higher the possibility that resin will become clogged between the cutters 14. Accordingly, the minimum value of the interval between the cutters 14 can be determined by testing or the like depending on the thickness of the prepreg tape T.

Since the thickness of each cutter 14 gradually decreases toward the tip as shown in FIG. 7, disposing the first circular cutters 14A and the second circular cutters 14B alternately allows making the interval between the cutters 14 narrower than the maximum thickness of the cutter 14. For example, even when the maximum thickness of the cutter 14 necessary to ensure the strength of the cutter 14 is 0.3 mm, it is possible to dispose the cutters 14 at intervals of 0.25 mm. In this case, a washer having a thickness of 0.2 mm can be used as each of the first spacers 22A and the second spacers 22B since the interval between the first circular cutters 14A and the interval between the second circular cutters 14B are both 0.5 mm.

In principle, each width of the cut prepreg tapes T is equal to the interval between the cutters 14. Therefore, when the interval between the cutters 14 is set to not less than 0.25 mm and not more than 0.8 mm, each width of the cut prepreg tapes T is also not less than 0.25 mm and not more than 0.8 mm in principle. Accordingly, each cut prepreg tape T can also be said to be in the form of a string.

As described above, the interval between the cutters 14 can be determined so that each width of the cut prepreg tapes T may become such a width that the thickness of the overlapped cut prepreg tapes T may become as uniform as possible while the cut prepreg tapes T may not clog the cutters 14.

On the other hand, the number of the cutters 14 can be determined in accordance with the width $W_0$ of the uncut prepreg tape T. That is, the number of the cutters 14 can be determined so that the cutter unit 13 can cover the width $W_0$ of the uncut prepreg tape T in a state where the cutters 14 are disposed at appropriate intervals. More specifically, the number of the first circular cutters 14A and the number of the second circular cutters 14B can be determined so that the length in the rotational axis direction of the portion of the first cutter roller 15A where the first circular cutters 14A are located, and the length in the rotational axis direction of the portion of the second cutter roller 15B where the second circular cutters 14B are located may be each greater than or equal to the width $W_0$ of the uncut prepreg tape T.

The width of the prepreg tape T for an aircraft is standardized in units of inches in many cases. It was confirmed by preform prototype tests that it was desirable to make the width of the prepreg tape T not more than ¼ inch (6.35 mm) from the viewpoint of securing the quality of a preform produced as a laminated body of the prepreg tapes T when steering lamination was performed in which the lamination head 3 of the AFP apparatus 1 was rotated along a curved line to feed the prepreg tape T onto the table 2.

When the width $W_0$ of the uncut prepreg tape T is ¼ inch (6.35 mm), it is practical to set each of the number of the first circular cutters 14A and the number of the second circular cutters 14B to four or more so that the prepreg tape T may be cut into nine or more partial prepreg tapes T with a total of eight or more cutters 14. In this case, each width of the cut prepreg tapes T is less than 0.8 mm.

As a matter of course, a prepreg tape T having a desired width $W_0$, such as a prepreg tape T having a width of ⅛ inch or a prepreg tape T having a width of 1 inch, may be used as the material, and the width may be adjusted by the fiber width adjustment device 6. That is, the prepreg tape T having the desired width $W_0$ can be supplied to the cutter unit 13 of the fiber width adjustment device 6 as long as the prepreg tape T can be supplied within the range where the cutters 14 are disposed.

The diameter of each circular cutter 14 can be determined according to the shape of the cutting edge of the cutter 14 and the thickness of the prepreg tape T. For example, when the diameter of each cutter 14 is φ6 mm while washers each having a diameter of $\varphi^5$ mm are used as the first spacers 22A and the second spacers 22B, the protrusion height from the washers on both sides of each cutter 14 and the radial overlap amount between the first circular cutter 14A and the second circular cutter 14B are approximately 0.5 mm.

Therefore, the cutter unit 13 can cut not only a thin layer tape having a thickness of 0.025 mm to 0.2 mm, but also a prepreg tape T having a thickness of 0.5 mm or less. When it is necessary to cut a thicker prepreg tape T with the cutter unit 13, the difference between the diameter of each cutter 14 and the diameter of each washer used as the first spacers 22A and the second spacers 22B can be made larger.

As the prepreg tapes T pass between the first cutter roller 15A and the second cutter roller 15B, movement of the prepreg tapes T in the width direction is prevented by the first circular cutters 14A and the second circular cutters 14B, as described above. Therefore, it is not essential to form wall surfaces on the first cutter roller 15A and the second cutter roller 15B to prevent the prepreg tapes T from falling off.

It is necessary to ensure that the first cutter roller 15A does not interfere with the second cutter roller 15B even when the first circular cutters 14A and the second circular cutters 14B are alternately disposed. Specifically, it is necessary to prevent the first bearings 21A rotatably supporting the first cutter roller 15A from coming into contact with the second bearings 21B rotatably supporting the second cutter roller 15B.

Accordingly, the diameters of the outer rings of the first bearings 21A and the diameters of the outer rings of the second bearings 21B can be made smaller than the diameters of the first circular cutters 14A and the diameters of the second circular cutters 14B, respectively as shown in FIG. 6 in order to prevent interference between the first cutter roller 15A and the second cutter roller 15B. In the example shown in FIG. 6, the diameters of the outer rings of the first bearings 21A and the diameters of the outer rings of the second bearings 21B are the same as the outer diameters of the washers used as the first spacers 22A and the second spacers 22B.

As described above, the first spacers 22A and the second spacers 22B also function as blade receivers for the opposing second circular cutters 14B and the opposing first circular cutters 14A, respectively. When the first spacers 22A and the second spacers 22B used as the blade receivers have too large strength, chipping or wear of the second circular cutters 14B and the first circular cutters 14A may arise.

Each of the second circular cutters 14B and the first circular cutters 14A can be made of a desired metal having the mechanical strength required to cut the prepreg tape T. Accordingly, when each of the first spacers 22A and the second spacers 22B is made of resin, it is possible to prevent chipping and wear of the second circular cutters 14B and the first circular cutters 14A.

Nevertheless, if a washer having a thickness of 0.2 mm is made of resin, not only the strength of the washer may be insufficient, but also it may be difficult to produce and obtain the washer. Accordingly, the first spacers 22A and the second spacers 22B may consist of easily available metal washers, such as standardized steel washers, while the outer rings of the first bearings 21A supporting the first support shaft 20A and the outer rings of the second bearings 21B supporting the second support shaft 20B may be respectively supported by buffer members 23 each made of an elastic body, such as a spring or rubber, or a suspension, such as damper rubber, having spring and damper properties, as shown in FIG. 6.

Thereby, chipping and wear of the first circular cutters 14A and the second circular cutters 14B can be prevented since each of the first cutter roller 15A and the second cutter roller 15B is slightly slidable in a direction perpendicular to the rotation axis even when the first circular cutters 14A and the second circular cutters 14B each made of metal respectively come into direct contact with the second spacers 22B and the first spacers 22A, each made of metal, which function as the blade receivers, or even when the first circular cutters 14A and the second circular cutters 14B come into indirect contact with the second spacers 22B and the first spacers 22A via the resin.

In other words, supporting at least one of the first support shaft 20A, which is the rotating shaft of the first cutter roller 15A, and the second support shaft 20B, which is the rotating shaft of the second cutter roller 15B, with the buffer members 23 allows preventing chipping and wear of the first circular cutters 14A and the second circular cutters 14B even when the first spacers 22A and the second spacers 22B are easily available metal washers.

Figure 8:
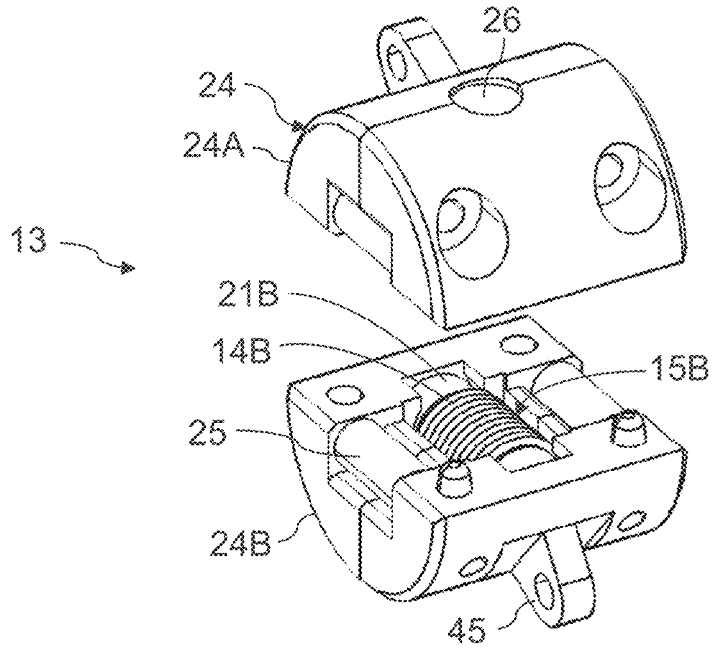
FIG. 8 is an exploded perspective view of the cutter unit shown in FIG. 2 including a housing.

FIG. 8 is an exploded perspective view of the cutter unit 13 shown in FIG. 2 including a housing 24.

The first cutter roller 15A and the second cutter roller 15B illustrated in FIG. 6 are targets to be rotated by the twisting mechanism 10 in a plane including the rotation axes of the first support shaft 20A and the second support shaft 20B. That is, the first cutter roller 15A and the second cutter roller 15B are rotated by the drive of the twisting mechanism 10 about an axis perpendicular to the plane including the rotation axes of the first support shaft 20A and the second support shaft 20B.

Accordingly, the first cutter roller 15A and the second cutter roller 15B can be housed in the housing 24 having a shape suitable for rotation. In addition, the housing 24 can be configured to be decomposable so that the number and intervals of the first circular cutters 14A and the second circular cutters 14B can be adjusted, and so that the first circular cutters 14A and the second circular cutters 14B can be retracted from the prepreg tape T.

As a specific example, the housing 24 can be composed of a first housing 24A that houses the first cutter roller 15A and a second housing 24B that houses the second cutter roller 15B so that the housing 24 can be disassembled, as shown in FIG. 8. The respective shapes of the first housing 24A and the second housing 24B can be determined so that the shape of the housing 24 may be approximately circular as viewed from the direction of the rotation axis of the cutter unit 13 by the twisting mechanism 10.

In the example shown in FIG. 8, the first housing 24A can be combined with the second housing 24B at a predetermined position by inserting two tapered protrusions formed on the first housing 24A into two blind holes formed on the second housing 24B while inserting two tapered protrusions formed on the second housing 24B into two blind holes formed on the first housing 24A. Accordingly, the first housing 24A can be easily separated from or combined with the second housing 24B by simply moving at least one of the first housing 24A and the second housing 24B parallel to the height direction of the protrusions.

Figure 9:
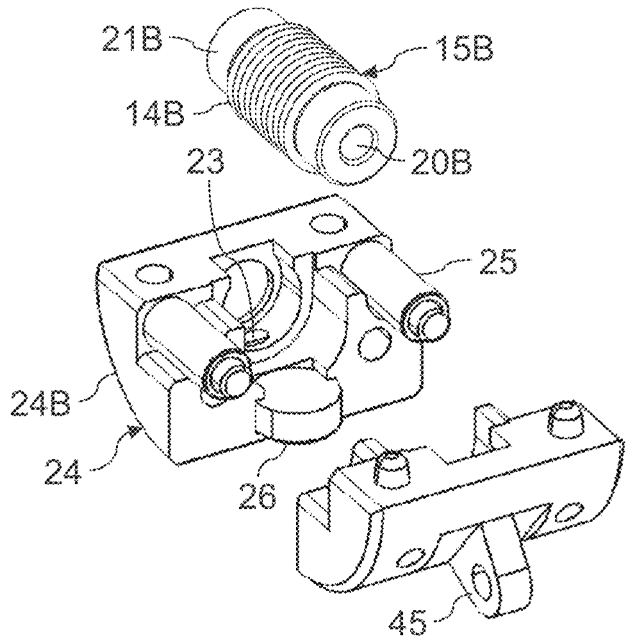
FIG. 9 is an exploded perspective view of the second housing and the second cutter roller disposed on the lower side of the cutter unit shown in FIG. 8.

FIG. 9 is an exploded perspective view of the second housing 24B and the second cutter roller 15B disposed on the lower side of the cutter unit 13 shown in FIG. 8.

As shown in FIGS. 8 and 9, a pair of auxiliary rollers 25 for pressing the prepreg tapes T in the thickness direction while feeding the prepreg tapes T out can be disposed before and after the first cutter roller 15A and the second cutter roller 15B as viewed from the feeding direction F of the prepreg tapes T. In the example shown in FIGS. 8 and 9, the rotating shafts of the two upper cylindrical auxiliary rollers 25 disposed before and after the first cutter roller 15A are held by the first housing 24A while the rotating shafts of the two lower cylindrical auxiliary rollers 25 disposed before and after the second cutter roller 15B are held by the second housing 24B.

As explained with reference to FIG. 6, the outer rings of the first bearings 21A supporting the first support shaft 20A of the first cutter roller 15A can be disposed in the first housing 24A with the buffer members 23, such as damper rubbers, interposed therebetween. Similarly, the outer rings of the second bearings 21B supporting the second support shaft 20B of the second cutter roller 15B can also be disposed in the second housing 24B with the buffer members 23, such as damper rubbers, interposed therebetween.

In the example shown in FIG. 9, the column-shaped buffer members 23 are inserted into blind holes formed in the second housing 24B so that end portions of the buffer members 23 may protrude slightly, and thereby the outer rings of the second bearings 21B at both ends of the second cutter roller 15B can be supported by the column-shaped buffer members 23 against the loads, respectively. Similarly, the column-shaped buffer members 23 can be inserted into blind holes formed in the first housing 24A so that end portions of the buffer members 23 may protrude slightly, and then the outer rings of the first bearings 21A at both ends of the first cutter roller 15A placed on the second cutter roller 15B can be brought into contact with the column-shaped buffer members 23 above, respectively.

That is, each of the inner rings of the first bearings 21A is fitted with the first support shaft 20A with an interference fit tolerance while each of the outer rings of the first bearings 21A is not completely fixed to the first housing 24A. Similarly, each of the inner rings of the second bearings 21B is fitted with the second support shaft 20B with an interference fit tolerance while each of the outer rings of the second bearings 21B is not completely fixed to the second housing 24B.

Therefore, the first cutter roller 15A and the second cutter roller 15B are housed in the first housing 24A and the second housing 24B, respectively, in a state in which the first cutter roller 15A and the second cutter roller 15B can move slightly in a direction perpendicular to the longitudinal direction of the first support shaft 20A and the second support shaft 20B relative to the first housing 24A and the second housing 24B, respectively. Thereby, it is possible to prevent chipping and wear of the first circular cutters 14A and the second circular cutters 14B caused by contact with the second spacers 22B and the first spacers 22A, as described above.

Furthermore, in the example shown in FIGS. 8 and 9, magnets 26 for holding the first housing 24A and the second housing 24B are embedded on the upper side of the first housing 24A and on the lower side of the second housing 24B, respectively. Therefore, the first cutter roller 15A and the second cutter roller 15B can be retracted from the prepreg tapes T by pulling the first housing 24A and the second housing 24B away from each other.

Note that, long holes for inserting the outer rings of the first bearings 21A can be formed in the first housing 24A, and then the buffer members 23 can be protruded from the inner surfaces of the long holes, respectively, in order to prevent the first cutter roller 15A from falling off the first housing 24A when the first housing 24A is pulled apart from the second housing 24B. In the example shown in FIG. 9, stepped long holes are also formed in the lower second housing 24B so that the second cutter roller 15B may not come off from the second housing 24B.

Figure 10:
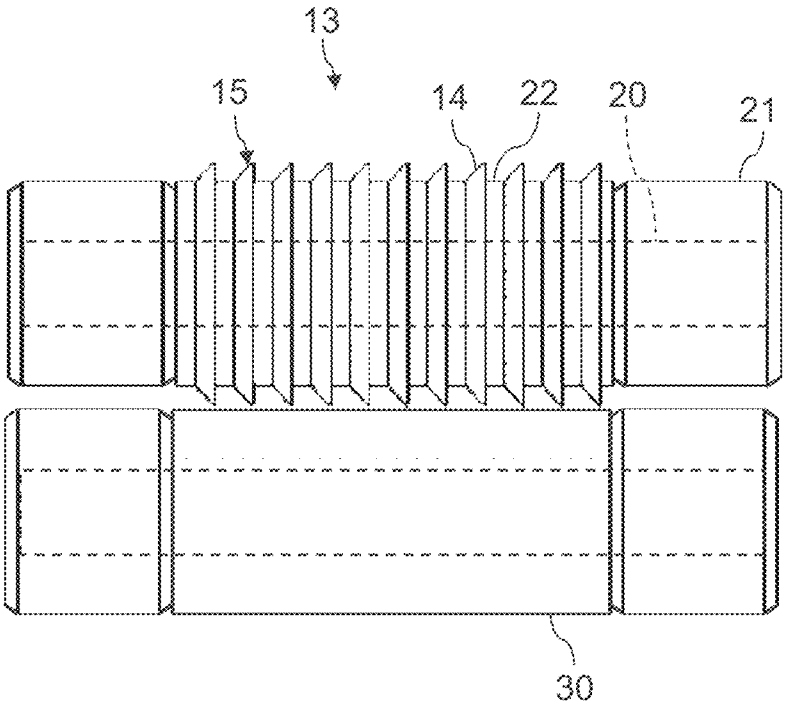
FIG. 10 is a front view showing a first modification of the cutter unit shown in FIG. 2.

FIG. 10 is a front view showing a first modification of the cutter unit 13 shown in FIG. 2.

The cutter unit 13 may not be configured to sandwich the uncut prepreg tape T and the cut prepreg tapes T between the first cutter roller 15A and the second cutter roller 15B as shown in FIGS. 6 to 9, but may be configured to sandwich the uncut prepreg tape T and the cut prepreg tapes T between a single cutter roller 15 and a cylindrical support roller 30 having no cutters 14 as shown in FIG. 10. In this case, the support roller 30 functions as a blade receiver for the circular cutters 14 rotatably supported by the support shaft 20 of the cutter roller 15.

Accordingly, the support roller 30 can be made of resin in order to prevent chipping and wear of the circular cutters 14. In this case, the outer rings of the bearings 21 that rotatably support the support shaft 20 of the cutter roller 15 may be fixed to the housing 24 without using the buffer members 23. Therefore, when the cutter unit 13 has the single cutter roller 15 as shown in FIG. 10, the structure of the entire cutter unit 13 including the housing 24 can be simplified and the number of parts can be reduced.

Nevertheless, the minimum value of the interval between the cutters 14 in a case where the cutter unit 13 has the single cutter roller 15 is the interval when the spacers 22 are removed, i.e., the maximum value of the thickness of the cutter 14. In contrast, when the cutter unit 13 is configured to sandwich the uncut prepreg tape T and the cut prepreg tapes T between the first cutter roller 15A and the second cutter roller 15B, as shown in FIGS. 6 to 9, the minimum interval between the cutters 14 can be made smaller than the maximum thickness of the cutter 14.

Accordingly, when the cutter unit 13 is configured to sandwich the uncut prepreg tape T and the cut prepreg tapes T between the first cutter roller 15A and the second cutter roller 15B as shown in FIGS. 6 to 9, the thickness of the prepreg tape T, having an adjusted width, integrated by applying pressure with the pressure unit 11 can be made more uniform compared with that in the case where the cutter unit 13 has the single cutter roller 15 as shown in FIG. 10 since the width of each cut prepreg tape T can be made narrower.

Figure 11:
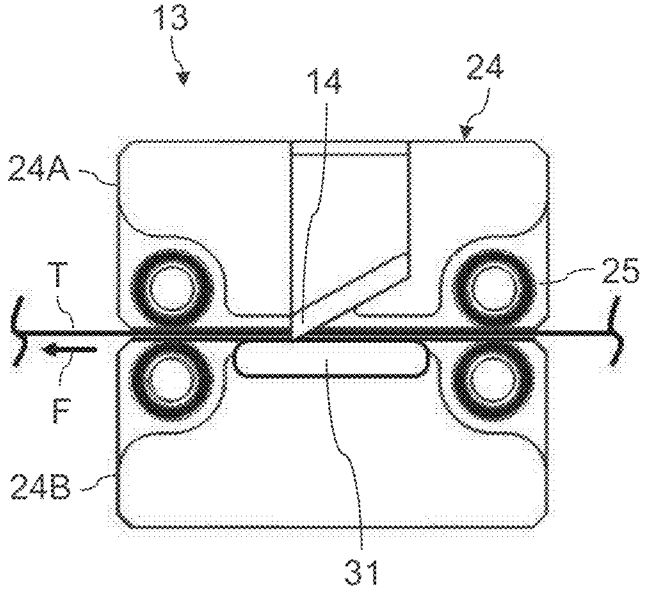
FIG. 11 is a side view showing a second modification of the cutter unit shown in FIG. 2.
Figure 12:
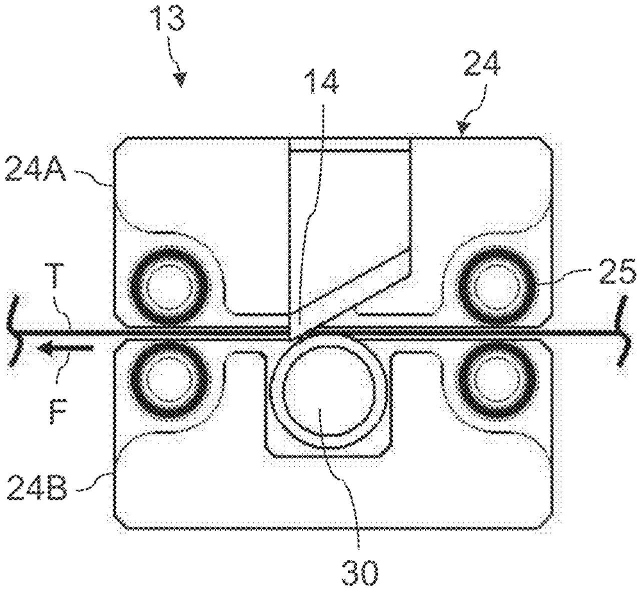
FIG. 12 is a side view showing a second modification of the cutter unit shown in FIG. 2.
Figure 13:
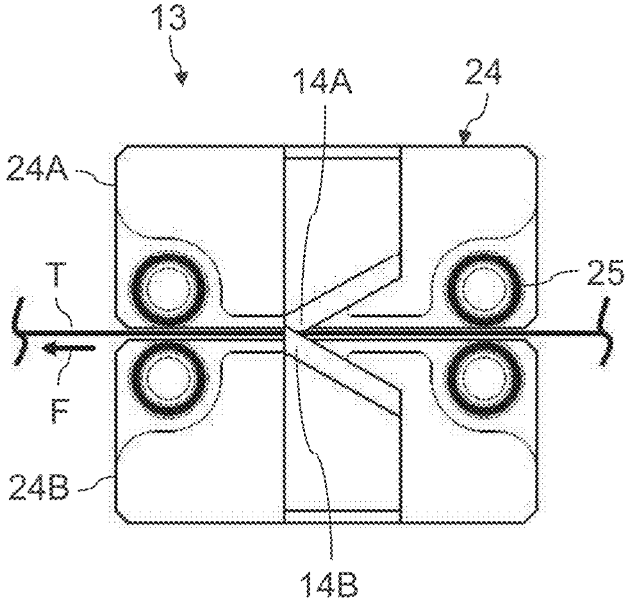
FIG. 13 is a side view showing a second modification of the cutter unit shown in FIG. 2.

Each of FIG. 11 to FIG. 13 is a side view showing a second modification of the cutter unit 13 shown in FIG. 2.

Although examples of the roller-type cutter unit 13 is illustrated in FIGS. 6 to 10, the prepreg tape T may also be cut using non-roller type cutters 14 each having a fixed cutting edge as shown in FIGS. 11 to 13. As a specific example, a plate-shaped or block-shaped blade receiver 31 can be disposed at the position facing the cutters 14 with the prepreg tape T sandwiched therebetween as shown in FIG. 11. Alternatively, the support roller 30 may be disposed at the position facing the cutters 14 as shown in FIG. 12 instead of the blade receiver 31 shown in FIG. 11. When the blade receiver 31 or the support roller 30 is made of resin, the cutters 14 and the blade receiver 31 or the support roller 30 can be attached to the housing 24 without necessarily using the buffer members 23 therebetween.

Also when the cutting edges of the cutters 14 are fixed, the interval between the cutters 14 can be adjusted by disposing spacers. As another example, first fixed-blade cutters 14A and second fixed-blade cutters 14B each having a fixed blade tip may be disposed alternately on both sides of the prepreg tape T so as to make cuts in the prepreg tape T from both sides as shown in FIG. 13.

Nevertheless, as a result of actually conducted tests in which a prepreg tape T containing nonwoven fabric was cut by the cutters 14 having the fixed cutting edges, a defect that the nonwoven fabric jammed the cutters 14 was confirmed. Therefore, it is appropriate to employ the roller-type cutter unit 13 shown in FIGS. 6 to 10 in order to allow stably adjusting the width of the prepreg tape T regardless of the type of the prepreg tape T.

Note that, the resin-made support roller 30 shown in FIG. 10 may be replaced with the plate-shaped or block-shaped blade receiver 31 shown in FIG. 11. When the tack of the prepreg tape T is strong, it is realistic to use the resin support roller 30, which does not require the prepreg tape T to slide, as the blade receiver.

Next, an example of a detailed structure of the twisting mechanism 10 shown in FIG. 1 will be described.

Figure 14:
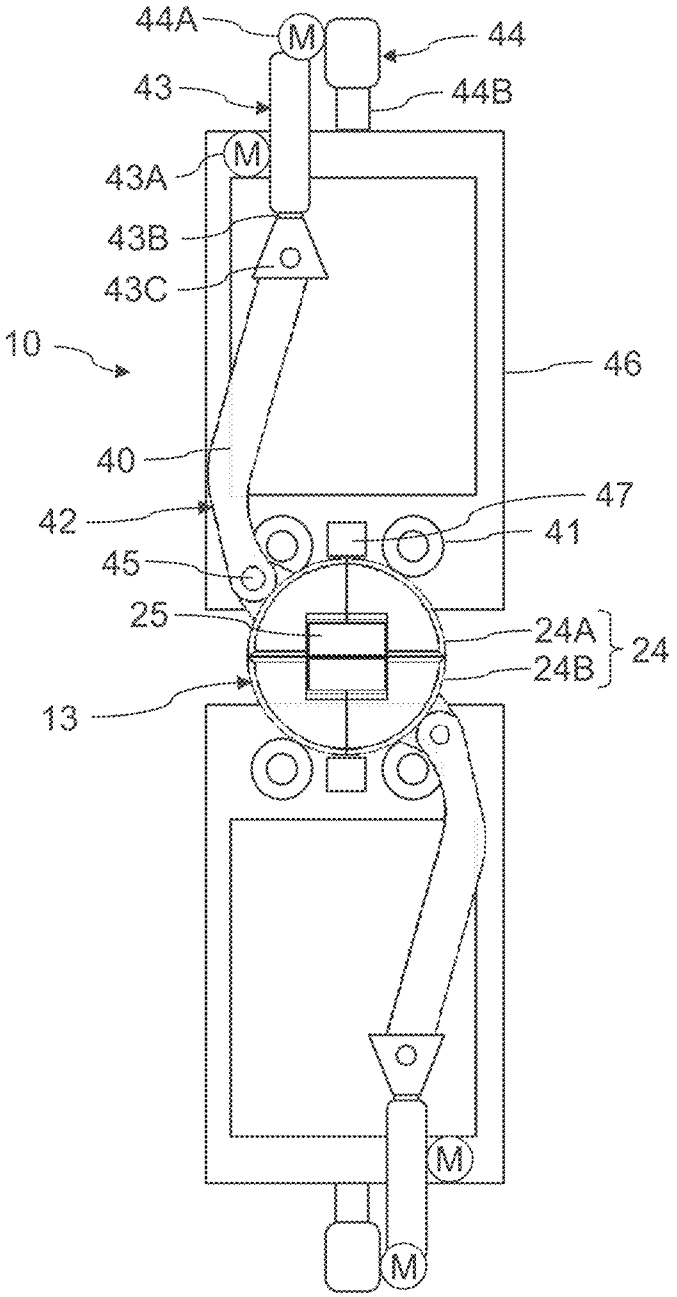
FIG. 14 is a front view showing an example of a detailed structure of the twisting mechanism shown in FIG. 1.
Figure 15:
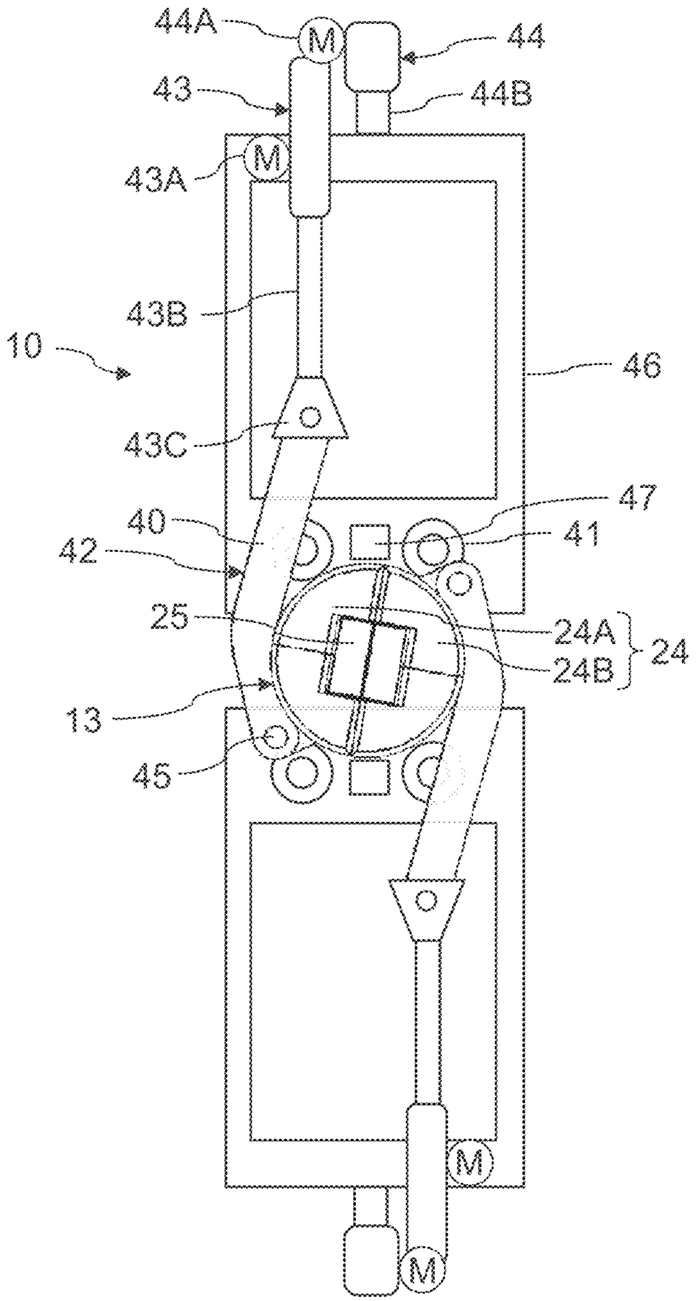
FIG. 15 shows a state in which the prepreg tapes have been twisted by rotating the cutter unit with the twisting mechanism shown in FIG. 14.
Figure 16:
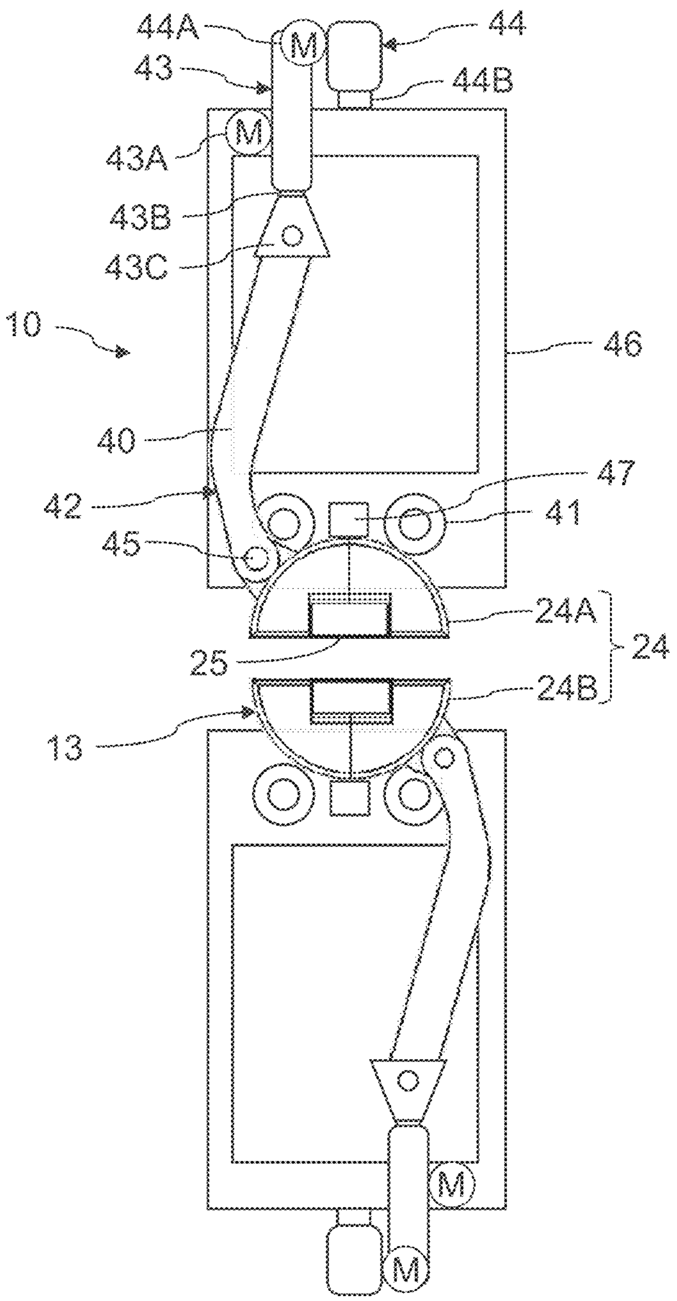
FIG. 16 shows an example in which the cutter unit shown in FIG. 14 is retracted from the prepreg tapes.
Figure 17:
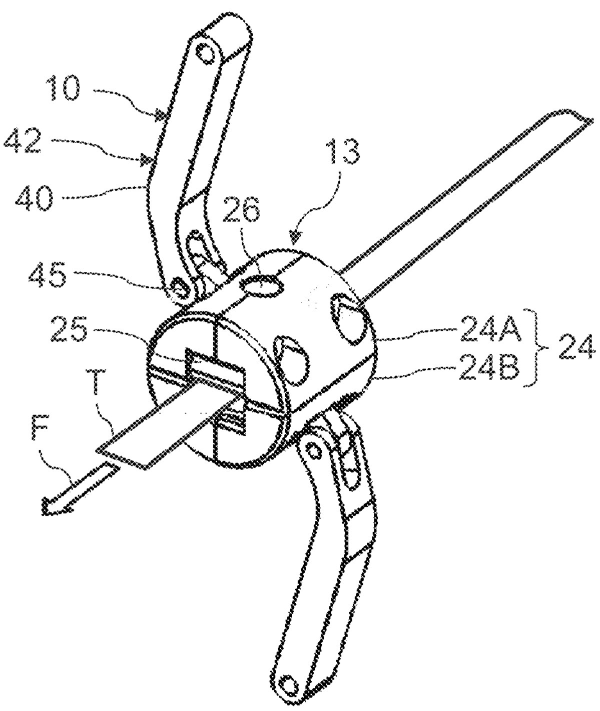
FIG. 17 is a perspective view showing the cutter unit shown in FIG. 14 together with the prepreg tapes and links of the twisting mechanism.
Figure 18:
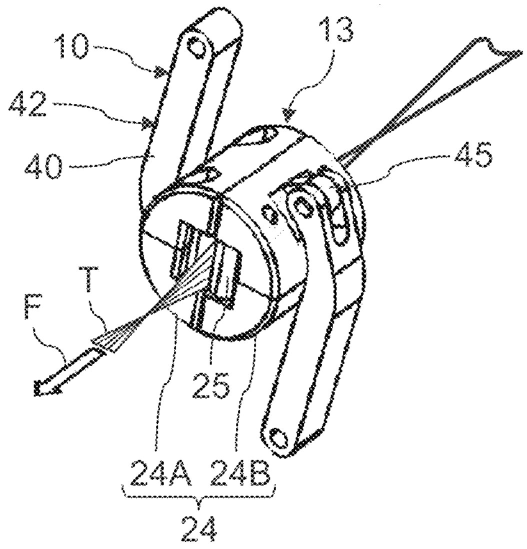
FIG. 18 is a perspective view showing the cutter unit shown in FIG. 15 together with the prepreg tapes and the links of the twisting mechanism.
Figure 19:
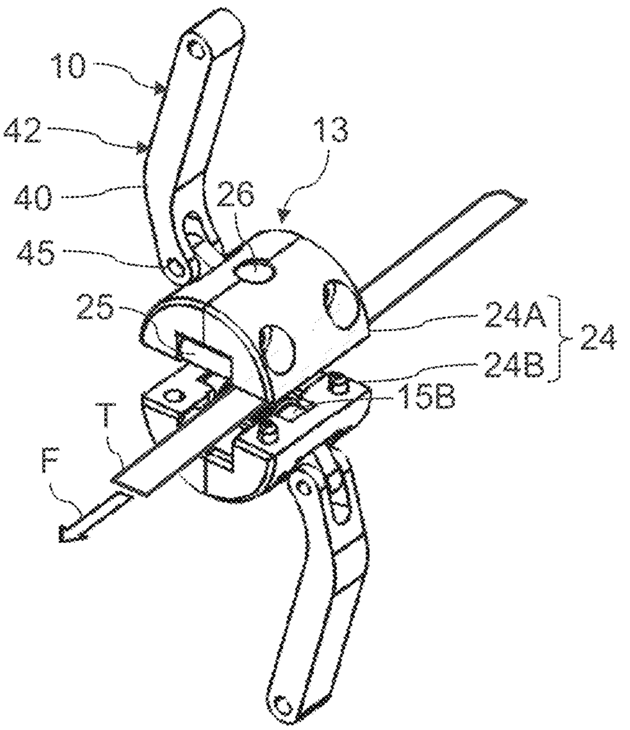
FIG. 19 is a perspective view showing the cutter unit shown in FIG. 16 together with the prepreg tapes and the links of the twisting mechanism.

FIG. 14 is a front view showing an example of a detailed structure of the twisting mechanism 10 shown in FIG. 1. FIG. 15 shows a state in which the prepreg tapes T have been twisted by rotating the cutter unit 13 with the twisting mechanism 10 shown in FIG. 14. FIG. 16 shows an example in which the cutter unit 13 shown in FIG. 14 is retracted from the prepreg tapes T. FIG. 17 is a perspective view showing the cutter unit 13 shown in FIG. 14 together with the prepreg tapes T and links 40 of the twisting mechanism 10. FIG. 18 is a perspective view showing the cutter unit 13 shown in FIG. 15 together with the prepreg tapes T and the links 40 of the twisting mechanism 10. FIG. 19 is a perspective view showing the cutter unit 13 shown in FIG. 16 together with the prepreg tapes T and the links 40 of the twisting mechanism 10.

The twisting mechanism 10 can be a device that indirectly twists the prepreg tape T by rotating the cutter unit 13 itself about a rotation axis parallel to the feeding direction F and the length direction of the prepreg tape T. The twisting mechanism 10 can be controlled by the control unit 5 of the AFP apparatus 1. That is, the twisting mechanism 10 can be subject to integrated control by the control unit 5 of the AFP apparatus 1, and thereby the twisting mechanism 10 can be interlocked with other objects controlled by the control unit 5.

Here, an example will be described in which the cutter unit 13 rotated by the twisting mechanism 10 has the configuration that the first cutter roller 15A and the second cutter roller 15B as shown in FIGS. 6 and 7 are housed in the cylindrical housing 24 divisible into the first housing 24A and the second housing 24B as shown in FIGS. 8 and 9. As a matter of course, the cutters 14 having a different structure as shown in FIGS. 10 to 13 may be housed in the housing 24, and the shape and detailed structure of the housing 24 may be changed.

In case of the cutter unit 13 having the first cutter roller 15A and the second cutter roller 15B, the first cutter roller 15A including the first support shaft 20A and the second cutter roller 15B including the second support shaft 20B are rotated around the rotation axis together with the housing 24 by the twisting mechanism 10 on the plane including the rotation axis of the first support shaft 20A and the rotation axis of the second support shaft 20B.

It is practical to provide the twisting mechanism 10 with a function to retract the first cutters 14A and the second cutters 14B from the prepreg tape T as shown in FIGS. 16 and 19 in addition to a function to rotate the housing 24 of the cutter unit 13 around the rotation axis as shown in FIGS. 15 and 18. Thereby, it is possible to prevent the cutters 14 from coming into contact with the prepreg tape T and causing unnecessary cuts when the width of the prepreg tape T is not changed. That is, when the width of the prepreg tape T is not changed, the prepreg tape T can be passed through the cutter unit 13 without coming into contact with the cutters 14.

The first cutters 14A and the second cutters 14B can be retracted from the prepreg tape T by separating the first housing 24A that houses and holds the first cutter roller 15A and the second housing 24B that houses and holds the second cutter roller 15B from each other without changing the position of the prepreg tape T, as shown in FIGS. 16 and 19.

The tension of the prepreg tape T while the first housing 24A is being separated from the second housing 24B can be kept by the pressure unit 11 and the tension roller unit 16 as shown in FIGS. 1 and 2. In other words, keeping the tension of the prepreg tape T by the pressure unit 11 and the tension roller unit 16 allows separating the first housing 24A and the second housing 24B from each other without changing the position of the prepreg tape T.

On the other hand, the housing 24 can be rotated only when the first housing 24A is in contact with the second housing 24B, and the first cutters 14A and the second cutters 14B are in contact with the prepreg tape T, as shown in FIGS. 15 and 18. Preventing the position of the rotation axis of the housing 24 from changing even when the housing 24 is rotated facilitates rotational control of the housing 24.

In particular, fixing the rotation axis of the housing 24 to the center of the rectangular area formed between the rotation axis of the first cutter roller 15A and the rotation axis of the second cutter roller 15B can simplify the rotational control of the housing 24 most. In this case, even when the prepreg tape T is supplied between the first cutter roller 15A and the second cutter roller 15B in a shifted state in the width direction, the width of the prepreg tape T can be narrowed down to the length projected onto the rotation axis of any of the pressure rollers 12 as described with reference to FIGS. 3 to 5 since the position of the rotation axis of the housing 24 and the line segment representing the cross section of the prepreg tape T when the thickness of the prepreg tape T is ignored are on the same straight line.

Accordingly, the housing 24 can have a cylindrical shape centered on the rotation axis of the housing 24 as shown in FIG. 8. In that case, the housing 24 can be rotatably supported by three or more support rollers 41 so that the position of the rotation axis of the housing 24 may not change as shown in FIGS. 14 and 15. Each of the support rollers 41 may be a bearing.

Note that, the cylindrical housing 24 is divided and separated into the first housing 24A and the second housing 24B as shown in FIG. 16. Accordingly, the housing 24 in the example shown in FIGS. 14 to 16 is supported by the four support rollers 41 consisting of the two support rollers 41 that are separated together with the first housing 24A from the second housing 24B, and the two support rollers 41 that are separated together with the second housing 24B from the first housing 24A.

In addition to the support rollers 41 that rotatably support the housing 24, the twisting mechanism 10 can include a drive mechanism consisting of link mechanisms 42, first electric actuators 43 and second electric actuators 44, which are configured to rotate the housing 24 and translate the first housing 24A and the second housing 24B.

More specifically, as shown in FIGS. 14 to 16, the twisting mechanism 10 further includes the links 40 and joints 45, and the first electric actuators 43 have first electric motor 43A, first rods 43B and joints 43C formed on the first rods 43B so that the first rods 43B can be extended and contracted by the first electric motors 43A using ball screws or the like, respectively. The joints 45 are fixed to the first housing 24A and the second housing 24B, respectively, so that the positions of the joints 45 may be point-symmetric about the rotation axis of the housing 24. One ends of the links 40 are rotatably coupled to the joints 45, respectively. The other ends of the links 40 are rotatably coupled to the joints 43C of the first electric actuators 43, respectively.

In this case, driving the two first electric actuators 43 to extend and contract the first rods 43B by a same length, respectively, allows rotating the housing 24 supported by the support rollers 41 around the rotation axis since the two joints 45 fixed to the housing 24 move together with the two links 40 whose both ends are free ends, respectively. The rotation angle $\theta$ of the housing 24 can be controlled by the amount of rotation of the first electric motors 43A, which corresponds to the amount of extension and contraction of the first rods 43B.

On the other hand, the second electric actuators 44 have second electric motors 44A and second rods 44B so that the second rods 44B can be extended and contracted by the second electric motors 44A using ball screws or the like, respectively. Then, the first housing 24A is coupled to one of the second rods 44B of the second electric actuators 44. Thereby, the first housing 24A can be retracted by driving the corresponding one of the second electric actuators 44. Similarly, the second housing 24B can be retracted by the other second electric actuator 44.

In the example shown in FIGS. 14 to 16, the twisting mechanism 10 further includes frames 46 and magnets 47. One of the magnets 47 magnetically holds the magnet 26 attached to the first housing 24A when the rotation angle θ of the housing 24 is 0 degrees. The second rod 44B of the second electric actuator 44, the housing of the first electric actuator 43 and the magnet 47 each corresponding to the first housing 24A as well as the support shafts of the two upper support rollers 41 that rotatably support the first housing 24A are each fixed to one of the frames 46.

Accordingly, when the rotation angle θ of the housing 24 is 0 degrees, the first housing 24A coupled to the frame 46 via a pair of the magnets 26, 47 can be moved parallel together with the support rollers 41 by extending and contracting the second rod 44B of the second electric actuator 44. That is, coupling the first housing 24A to the second rod 44B with the magnet 47 allows rotating the first housing 24A by detaching the first housing 24A from the magnet 47 when the first housing 24A has combined with the second housing 24B while moving the first housing 24A in parallel by holding the first housing 24A by the magnetic force of the magnet 47 when the rotation angle θ of the first housing 24A is 0 degrees.

Similarly, the second housing 24B can be moved in parallel together with the two lower support rollers 41 by coupling the second housing 24B to the second rod 44B of the other second electric actuator 44 via the other of the magnets 47. The upper and lower frames 46 may be configured to move in parallel along at least one guide. The upper and lower frames 46 may have projections and recesses so that the upper frame 46 can be combined with the lower frame 46.

Note that, the first housing 24A and the second housing 24B are indirectly coupled to the frames 46 via the links 40 of the link mechanisms 42 and the first electric actuators 43, respectively. Accordingly, the links 40 also function as coupling members to prevent the first housing 24A and the second housing 24B from separating from the frames 46 respectively even when at least one of the first housing 24A and the second housing 24B comes off the magnet 47 during translation.

The first electric motors 43A and the second electric motors 44A can be controlled by the control unit 5 of the AFP apparatus 1. Accordingly, the first cutter roller 15A and the second cutter roller 15B can be automatically retracted from the prepreg tape T, and automatically rotated so as to be inclined at a predetermined rotation angle θ by controlling the first electric motors 43A and the second electric motors 44A with the control unit 5 in accordance with a target width value of the prepreg tape T. Thereby, the width of the prepreg tape T can be automatically adjusted.

Note that, each of the first electric actuators 43 and the second electric actuators 44 may be replaced with a cylinder mechanism, such as a hydraulic cylinder, a pneumatic cylinder or an electric cylinder, or a linear motion mechanism, such as a rack and pinion. At least one motor may be shared among these machine elements by combining gears and/or links with at least one machine element.

Figure 20:
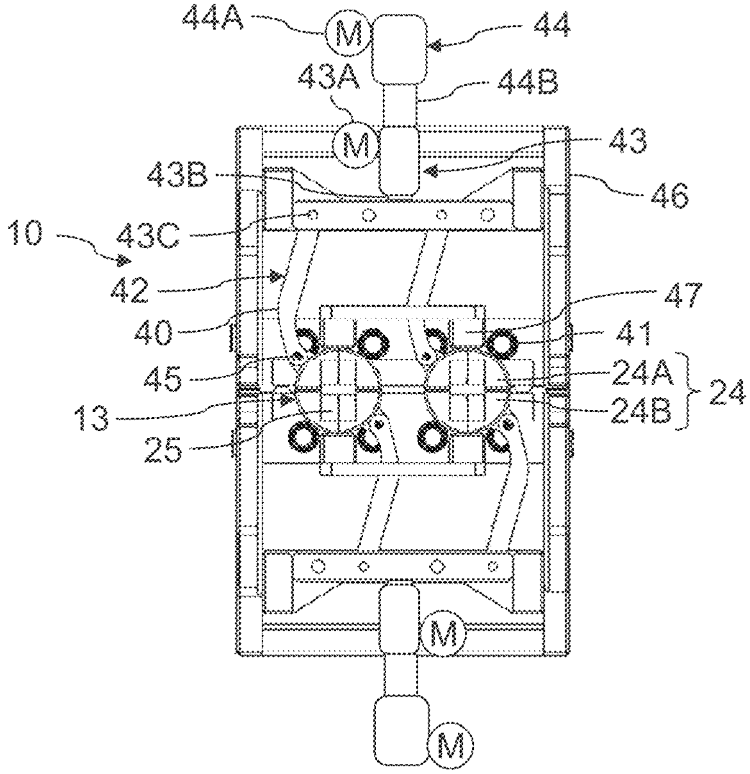
FIG. 20 is a front view showing an example in which the two cutter units are rotated by the twisting mechanism shown in FIG. 14.
Figure 21:
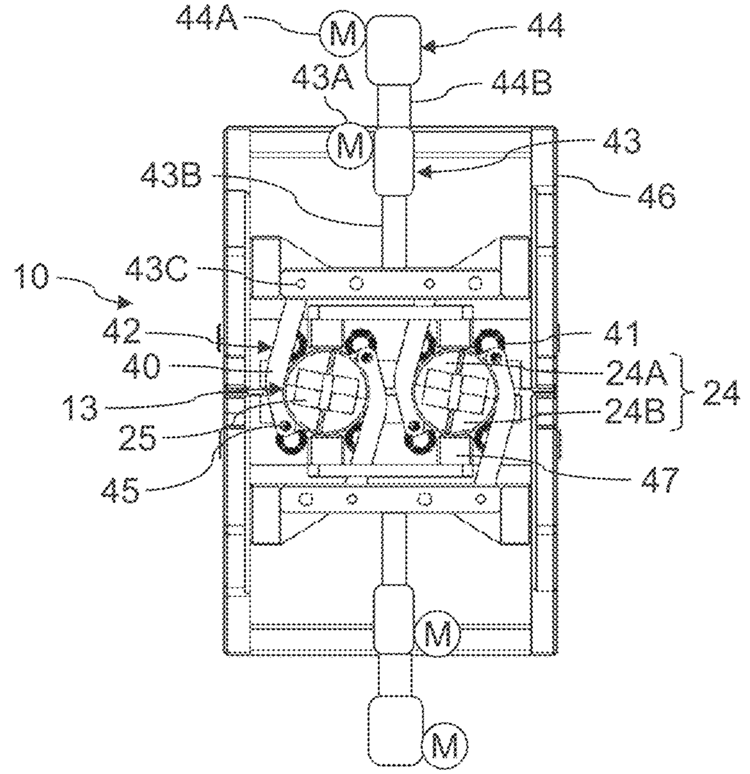
FIG. 21 shows a state in which the prepreg tapes have been twisted by rotating each of the cutter units with the twisting mechanism shown in FIG. 20.
Figure 22:
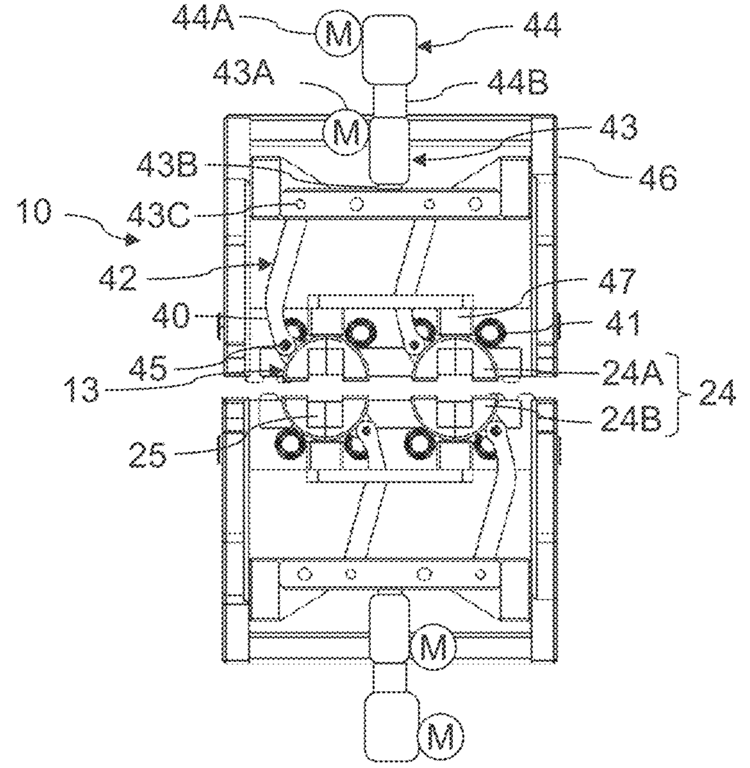
FIG. 22 shows an example in which each of the cutter units is retracted from the prepreg tapes by the twisting mechanism shown in FIG. 20.

FIG. 20 is a front view showing an example in which the two cutter units 13 are rotated by the twisting mechanism 10 shown in FIG. 14. FIG. 21 shows a state in which the prepreg tapes T have been twisted by rotating each of the cutter units 13 with the twisting mechanism 10 shown in FIG. 20. FIG. 22 shows an example in which each of the cutter units 13 is retracted from the prepreg tapes T by the twisting mechanism 10 shown in FIG. 20.

As shown in FIGS. 20 to 22, when a plurality of the joints 43C are coupled to the first rod 43B of the first electric actuator 43, it becomes possible to rotate and retract a plurality of the cutter units 13 by the common twisting mechanism 10. That is, it is possible to adjust the widths of the plurality of the prepreg tapes T using the common twisting mechanism 10.

Figure 23:
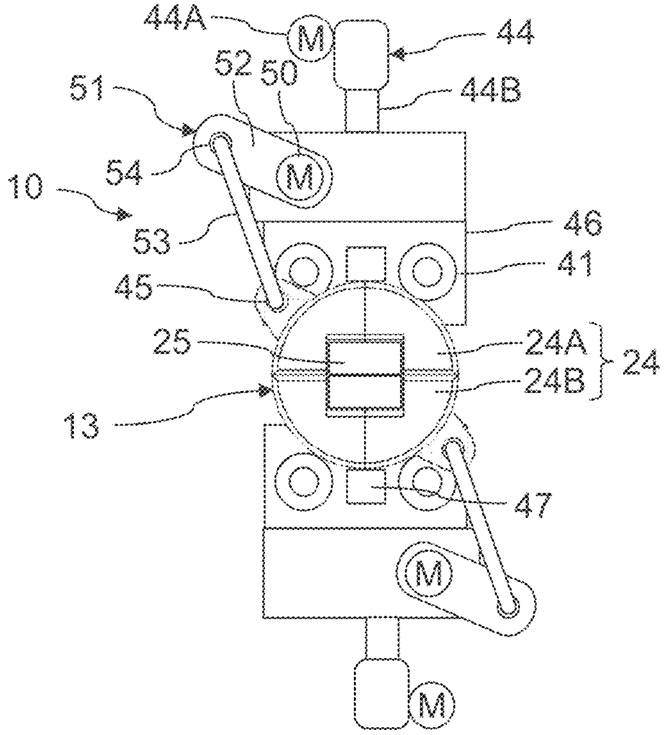
FIG. 23 is a front view showing another example of the twisting mechanism shown in FIG. 1, which is composed of motors and link mechanisms.
Figure 24:
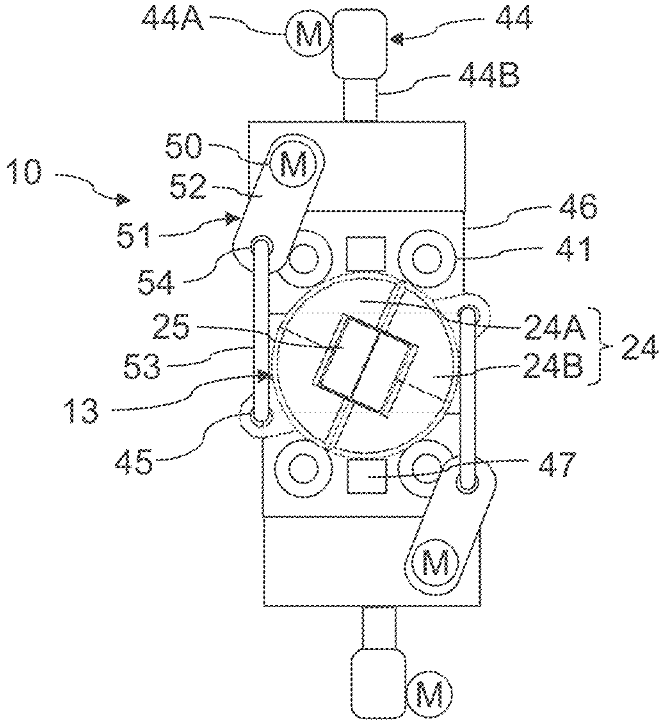
FIG. 24 shows a state in which the prepreg tapes have been twisted by rotating the cutter unit with the twisting mechanism shown in FIG. 23.

FIG. 23 is a front view showing another example of the twisting mechanism 10 shown in FIG. 1, which is composed of motors 50 and link mechanisms 51. FIG. 24 shows a state in which the prepreg tapes T have been twisted by rotating the cutter unit 13 with the twisting mechanism 10 shown in FIG. 23.

As shown in FIGS. 23 and 24, the housing 24 can also be rotated using only the motors 50 and the link mechanisms 51 without using the first electric actuators 43 as elements. In the example shown in FIGS. 23 and 24, two sets of the link mechanisms 51 include first links 52, second links 53 and joints 54, respectively. One ends of the first links 52 are fixed to the output shafts of the motors 50 as fixed ends respectively while the other ends of the first links 52 are rotatably coupled to one ends of the second links 53 via the joints 54 respectively. In one set of the link mechanism 51, the other end of the second link 53 is rotatably coupled to the joint 45 fixed to the first housing 24A.

Accordingly, rotating the output shaft of the motor 50 coupled to the one set of the link mechanism 51 by a predetermined amount allows rotating the first casing 24A by a rotation angle θ corresponding to the amount of rotation of the output shaft of the motor 50. Similarly, the second housing 24B can also be rotated by the other motor 50 and the other set of the link mechanism 51 including the first link 52, the second link 53 and the joint 54.

Figure 25:
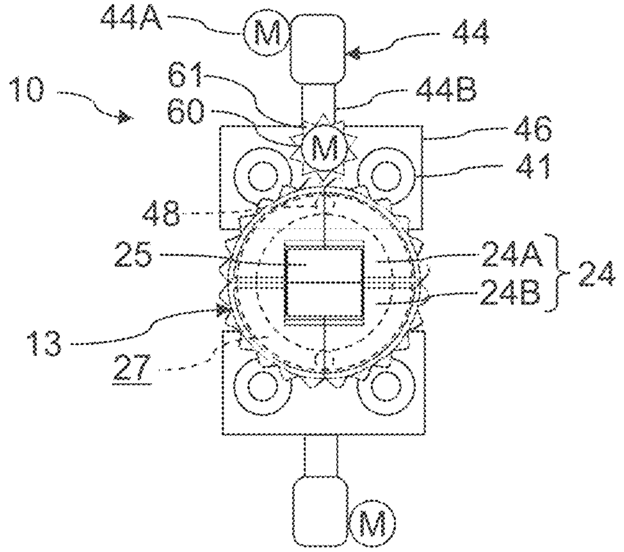
FIG. 25 is a front view showing an example in which the twisting mechanism shown in FIG. 1 is composed of a motor and a gear.
Figure 26:
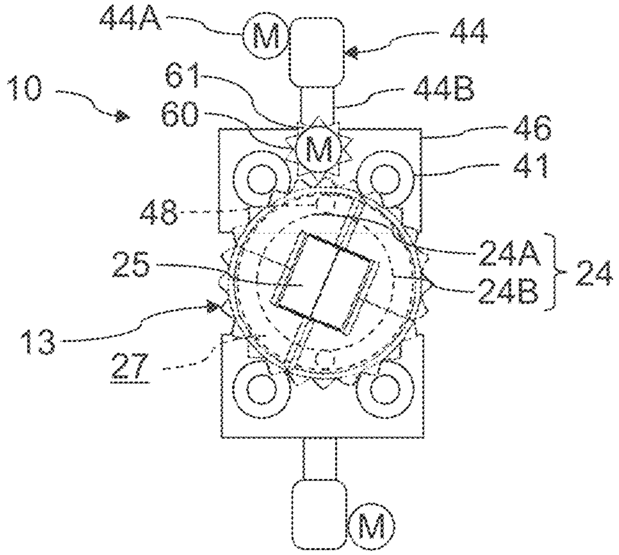
FIG. 26 shows a state in which the prepreg tapes have been twisted by rotating the cutter unit with the twisting mechanism shown in FIG. 25.

FIG. 25 is a front view showing an example in which the twisting mechanism 10 shown in FIG. 1 is composed of a motor 60 and a gear 61. FIG. 26 shows a state in which the prepreg tapes T have been twisted by rotating the cutter unit 13 with the twisting mechanism 10 shown in FIG. 25.

As shown in FIGS. 25 and 26, it is also possible to form teeth on the outer periphery of the circular housing 24 so that the housing 24 itself may serve as a gear, and to rotate the housing 24 with the gear 61 that is rotated by the motor 60. Multiple gears 61 and/or motors 60 may be used to rotate the housing 24. For example, three or more gears 61 may be disposed at appropriate positions and engaged with the teeth of the housing 24 so that the housing 24 can be supported and rotated by the multiple gears 61. In that case, the support rollers 41 that rotatably support the housing 24 can be omitted. When the housing 24 is supported by the multiple gears 61, it is not necessary to rotate all the gears 61 by the motor 60 or the motors 60, and what is necessary is to rotate at least one of the gears 61 by the motor 60 or the motors 60.

In the example shown in FIGS. 25 and 26, two pins 48 are fixed to the frames 46 respectively instead of the two upper and lower magnets 47. On the other hand, an annular groove 27 is formed in the circular housing 24, and the two pins 48 are inserted into the groove 27 of the housing 24.

Accordingly, when the first housing 24A has been combined with the second housing 24B, the housing 24 can be rotated by sliding the groove 27 of the housing 24 relative to the pins 48. On the other hand, when the rotation angle θ of the housing 24 is 0 degrees, the first housing 24A can be relatively pulled apart from the second housing 24B, or conversely, relatively brought closer to the second housing 24B to be combined with the second housing 24B by driving the second electric actuators 44 since the first housing 24A can be held by being sandwiched between the upper pin 48 and the two upper support rollers 41 while the second housing 24B can be held by being sandwiched between the lower pin 48 and the two lower support rollers 41.

As described above, the mechanism for holding each of the first housing 24A and the second housing 24B is not limited to the pair of the magnets 26, 27, but may be composed of the pin 48 and the groove 27 that slidably fit together. As a matter of course, also in the examples shown in FIGS. 14 to 24, the mechanisms for holding the first housing 24A and the second housing 24B may be composed of the pins 48 and the grooves 27, respectively.

Also, in the configuration examples of the twisting mechanism 10 shown in FIGS. 14 to 24, the mechanism for rotating the first housing 24A or the mechanism for rotating the second housing 24B may be omitted as long as the torque for rotating the housing 24 is sufficient since the housing 24 is supported by the support rollers 41 so that the position of the rotation axis of the housing 24 may not shift. In that case, it is important to determine the structure of the coupling portion between the first housing 24A and the second housing 24B so that rotating one of the first housing 24A and the second housing 24B may cause the other to rotate.

As in the above-mentioned configuration examples, the twisting mechanism 10 can be composed of at least one motor and at least one gear or link that rotates or translates by the power of the at least one motor. Each motor used as an element of the twisting mechanism 10 is not limited to an electric motor, but may be a pneumatic motor or a hydraulic motor.

When the twisting mechanism 10 is configured to rotate the prepreg tape T or the prepreg tapes T together with the housing 24 around the rotation axis, fixing the rotation axis of the housing 24 to the center of the passing area of the prepreg tape T or the prepreg tapes T in the cutter unit 13 leads to simplification of the rotation control of the housing 24, as described above. In this case, disposing the cutter unit 13 and the pressure unit 11 so that the rotation axis of the housing 24 and the center of the passing area of the prepreg tapes T in the pressure unit 11, which is composed of the pair of the pressure rollers 12 or the like, may lie on a same straight line leads to simplification of the rotation control of the housing 24 since the relationship between the unadjusted width and the adjusted width of the prepreg tape T becomes the relationship described with reference to FIGS. 3 to 5.

(Method of Molding Composite Material)

Next, a method of molding a composite material using the AFP apparatus 1 having the fiber width adjustment device 6 will be described.

In order to mold an FRP, a preform having a shape corresponding to a shape of the FRP after molding is first produced by laminating and shaping prepreg tapes T. For that purpose, the lamination jig J, having a simple shape, for laminating the prepreg tapes T as well as a shaping jig, having a complicated shape, for shaping a laminated body of the prepreg tapes T may be prepared separately. In this case, the laminated body of the prepreg tapes T laminated on the lamination jig J is transferred on the shaping jig and then shaped. Alternatively, the lamination jig J itself may be also used as the shaping jig.

The operation of laminating the prepreg tapes T on the lamination jig J is performed by the AFP apparatus 1 exemplified in FIG. 1. For that purpose, a bobbin wound with the prepreg tape T is set on a creel stand disposed inside the lamination head 3 or at a predetermined position outside the lamination head 3. At this time, an end portion of the prepreg tape T is sandwiched between the feed roller 7 and its support roller. When the AFP apparatus 1 is operated under the control of the control unit 5, the feed roller 7 rotates. Thereby, the end portion of the prepreg tape T is fed out.

When the end portion of the prepreg tape T reaches the surface of the lamination jig J, the feeding mechanism 4 is driven under the integrated control by the control unit 5, and thereby the lamination head 3 is moved in the direction opposite to a feeding direction of the prepreg tape T. As a result, the compaction roller 9 is moved relatively to the lamination jig J in the direction opposite to the feeding direction of the prepreg tape T, and eventually the end portion of the prepreg tape T is sandwiched between the compaction roller 9 and the lamination jig J. That is, the end portion of the prepreg tape T reaches the compaction roller 9.

Accordingly, when the lamination head 3 is continuously moved in the direction opposite to the feeding direction of the prepreg tape T, the prepreg tape T is fed in the feeding direction. The feeding speed of the prepreg tape T becomes a speed of the prepreg tape T being fed out while receiving pressure from the compaction roller 9, i.e., a relative speed of the table 2 and the lamination jig J to the compaction roller 9 and the lamination head 3.

After that, the prepreg tapes T can be laminated on the lamination jig J by moving the lamination head 3 along paths defined by a control program installed in the control unit 5. Since the lamination head 3 includes the fiber width adjustment device 6 for adjusting the width of the prepreg tape T, the prepreg tape T can be laminated while changing the width of the prepreg tape T by controlling the twisting mechanism 10 of the fiber width adjustment device 6 with the control unit 5 as long as the width of the prepreg tape T has been specified by the control program. That is, the prepreg tape T having an adjusted width can be produced using the fiber width adjustment device 6, and the prepreg tapes T each having an adjusted width can be laminated.

As a specific example, when the lamination head 3 is moved relative to the table 2 and the lamination jig J while rotating the cutter unit 13 of the fiber width adjustment device 6 by the twisting mechanism 10, the prepreg tape T whose width changes continuously according to the rotation angle θ of the cutter unit 13 can be laminated. Alternatively, when the cutter unit 13 of the fiber width adjustment device 6 is rotated by the twisting mechanism 10 until the width of the prepreg tape T reaches a desired width while the lamination of the prepreg tape T is temporarily interrupted and the lamination head 3 is retracted to a disposal area of the prepreg tape T, and subsequently the lamination of the prepreg tape T is resumed, the prepreg tape T whose width changes intermittently can be laminated.

When the adjustment of the widths of the prepreg tapes T using the fiber width adjustment device 6 and the lamination of the prepreg tapes T having the adjusted widths are completed in this way, the laminated body of the prepreg tapes T is obtained. When the FRP to be produced has a complicated shape like an aircraft part having a curved web and flange, it may be necessary to give the laminated body of the prepreg tapes T, placed on the lamination jig J, a shape corresponding to the shape of the FRP. In such a case, following the lamination process of the prepreg tapes T, a shaping process is performed to give the shape to the laminated body of the prepreg tapes T.

The laminated body of the prepreg tapes T can be shaped by heating with a heating device and pressurization. The pressurization can be performed by pressing a shaping mold to the laminated body of the prepreg tapes T with a pressing machine or applying atmospheric pressure to the laminated body of the prepreg tapes T by bagging. When the lamination jig J does not serve as a shaping mold, the laminated body of the prepreg tapes T is transferred from the lamination jig J on a shaping mold. Conversely, when the lamination jig J also serves as a shaping mold, the lamination jig J on which the laminated body of the prepreg tapes T is placed is transported to an area for carrying out the shaping process by bagging, a pressing machine, or the like.

When the shaping of the laminated body of the prepreg tapes T is completed, a preform having a shape corresponding to the shape of the FRP after molding is obtained. Note that, in a case where the FRP has a simple shape like an aircraft panel, and therefore the preform can be produced only by laminating the prepreg tapes T on the lamination jig J having a shape for the shaping, the lamination and the shaping of the prepreg tapes T are performed at the same time.

Once the preform is produced, the resin contained in the prepreg tapes T included in the preform is cured. That is, a curing process of the resin with which the laminated and shaped prepreg tapes T are previously impregnated is performed. Thereby, the FRP having a target shape can be molded.

When the resin is a thermosetting resin, the curing process of the resin is performed by heating the resin using a heating device, such as an oven or an autoclave apparatus. On the other hand, when the resin is a thermoplastic resin, the curing process of the resin is performed by heating and melting the resin once with a heating device, and then cooling the resin by air cooling or the like. In addition, an assembly process for combining the preform with at least one other preform and/or at least one other intermediately cured FRP as well as placing at least one other dry preform to be molded by the RTM method on the preform, and subsequent injection of resin into the at least one dry preform may also be performed prior to curing the resin.

The lamination jig J or the shaping jig may be used as a molding jig for molding the FRP by curing the resin included in the preform. Alternatively, a molding jig may be prepared separately, and the preform may be transferred from the lamination jig J or the shaping jig to the molding jig.

(Effects)

As described above, the fiber width adjustment device 6 and the method of molding the composite material adjust the width of the prepreg tape T by twisting the prepreg tape T and compressing the twisted prepreg tape T in a state where the twisted prepreg tape T is overlapped in the width direction. In addition, the prepreg tape T is divided in the width direction by the cutters 14 so that the twisted prepreg tape T consisting of the divided parts may be uniformly overlapped.

Accordingly, the fiber width adjustment device 6 and the method of molding the composite material can stably adjust the width of the prepreg tape T. Specifically, not only the width of the prepreg tape T can be adjusted to a desired width, but the thickness of the prepreg tape T whose width has been adjusted can be made uniform.

For example, in case of using a conventional fiber width adjustment device that changes the width of a prepreg tape by passing the prepreg tape through a path in which the distance between the wall surfaces gradually decreases, there is a problem that the prepreg tape hits the wall surfaces and thereby the end portions turn back, which makes only the end portions thicker. In addition, there is a problem that folds arising at the end portions of the prepreg tape propagate in the opposite direction to a feeding direction of the prepreg tape, which may narrow the width of the prepreg tape regardless of the width of the path. When the width of the prepreg tape is narrowed due to the propagation of the folds, it is difficult to restore the width of the prepreg tape to its original width.

In contrast, in case of the fiber width adjustment device 6 and the method of molding the composite material described above, both ends of the prepreg tape T do not come into contact with any wall surface. Therefore, no local folds arise at the end portions and no folds propagate. In addition, it is possible to prevent folding and twisting of a single prepreg tape T since the overall width of the prepreg tapes T changes as a result of the behavior of an assembly of the prepreg tapes T each having a minute width due to cutting of the prepreg tape T.

As a result, the width of the prepreg tapes T can be quickly restored to its original width. That is, the responsiveness to the change in width of the prepreg tapes T can be improved, and highly reproducible variable width transient characteristics can be obtained.

Figure 27:
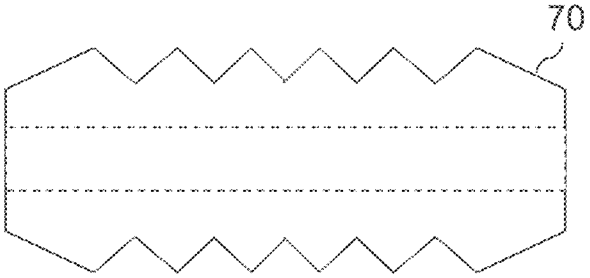
FIG. 27 is a front view of a cylindrical roller having a jagged surface that can be used as a replacement for the cutter unit shown in FIG. 2.
Figure 28:
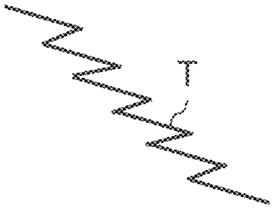
FIG. 28 shows a cross section of the prepreg tape when the prepreg tape is not cut by the cutter unit but is folded and twisted by the cylindrical roller shown in FIG. 27.

FIG. 27 is a front view of a cylindrical roller 70 having a jagged surface that can be used as a replacement for the cutter unit 13 shown in FIG. 2. FIG. 28 shows a cross section of the prepreg tape T when the prepreg tape T is not cut by the cutter unit 13 but is folded and twisted by the cylindrical roller 70 shown in FIG. 27.

The prepreg tape T can also be twisted by forming folds in the prepreg tape T using the cylindrical roller 70 having the jagged surface as shown in FIG. 27. That is, it is also possible to form folds using the cylindrical roller 70 without making cuts using the cutter unit 13. Note that, a cylindrical roller unit may be formed by disposing the two cylindrical rollers 70, each having the shape shown in FIG. 27, opposite to each other, and the prepreg tape T may be sandwiched between the two cylindrical rollers 70.

Nevertheless, when the prepreg tape T on which folds have been formed without being cut is twisted, triple overlapping portions inevitably arise in the prepreg tape T as shown in FIG. 28. That is, the prepreg tape T has portions where the thickness of the prepreg tape T is three times as large. As a result, when creases are formed by the cylindrical roller 70, the thickness of the prepreg tape T after width adjustment becomes non-uniform compared to that in case where the prepreg tape T is cut by the cutter unit 13. Therefore, it is desirable to cut the prepreg tape T with the cutter unit 13 from the viewpoint of making the thickness of the prepreg tape T uniform after the width adjustment.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, a dry tape which is tape-shaped fibers before being impregnated with resin may be laminated although a case where the prepreg tape T which is tape-shaped fibers after being impregnated with resin is laminated has been described in the above-mentioned implementation. A laminated body of dry tapes produced by laminating the dry tapes and shaping the dry tapes according to a shape of an FRP is called a dry preform.

When an FRP is formed using a dry preform as a material, the FRP is formed by the RTM method. More specifically, a process of impregnating fibers with uncured resin by injecting the uncured resin into the dry preform is performed prior to a process of curing the resin.

What is claimed is:

1. A fiber width adjustment device for adjusting a width of a tape made of fibers before or after the tape is impregnated with resin, the tape being a material for a fiber reinforced plastic, the device comprising:

cutters configured to divide the tape into partial tapes by making cuts in the tape, each length direction of the cuts being a length direction of the tape, the cutters being supported by at least one support shaft;

a press including at least one pressure roller configured to press the partial tapes in a thickness direction of the partial tapes; and a twisting mechanism configured to incline an axis of the at least one support shaft with respect to an axis of the at least one pressure roller so that the partial tapes are twisted between the cutters and the at least one pressure roller and adjacent ones of the partial tapes partially overlap each other in a width direction of the partial tapes, wherein the twisting mechanism has at least one motor and at least one gear or at least one link that rotates or translates by power of the at least one motor; and wherein the press configured to produce a sheeted tape having an adjusted width by pressing the overlapped partial tapes in a thickness direction of the partial tapes so that the partially overlapped partial tapes are integrated overlapped tape.

2. The fiber width adjustment device according to claim 1, wherein the cutters include circular cutters rotatably supported by the at least one support shaft, and wherein an axial direction of the at least one support shaft is a width direction of the tape at the cutters.

3. The fiber width adjustment device according to claim 2, wherein the at least one support shaft includes a first support shaft and a second support shaft, and wherein the circular cutters include:

first circular cutters rotatably supported by the first support shaft, the first support shaft having a first axial direction that is the width direction of the tape at the cutters, the first circular cutters being detachably supported by the first support shaft so that a number and intervals of the first circular cutters are changeable; and second circular cutters rotatably supported by the second support shaft, of which the second support shaft having a second axial direction parallel to the first axial direction, the second circular cutters being detachably supported by the second support shaft so that a number and intervals of the second circular cutters are changeable, the second circular cutters being disposed alternately with the first circular cutters so that the second circular cutters radially overlap the first circular cutters.

4. The fiber width adjustment device according to claim 2, wherein an interval between adjacent ones of the circular cutters is not less than 0.25 mm and not more than 0.8 mm.

5. The fiber width adjustment device according to claim 1, wherein the at least one pressure roller includes a pair of cylindrical pressure rollers configured to sandwich the partially overlapped partial tapes and press the partially overlapped partial tapes in the thickness direction.

6. The fiber width adjustment device according to claim 1, wherein the cutters are disposed before the at least one pressure roller in a feeding direction of the tape.

7. The fiber width adjustment device according to claim 1, further comprising a tension roller unit disposed before the cutters in a feeding direction of the tape, the tension roller unit being configured to keep tension of the tape and press the tape so that a thickness direction of the tape does not change.

8. A method of molding a composite material comprising:

using the fiber width adjustment device according to claim 1 for producing the sheeted tape having the adjusted width;

laminating the sheeted tape; and producing the fiber reinforced plastic by curing the resin included in the sheeted tape which has been laminated.

9. A method of molding a composite material comprising:

using the fiber width adjustment device according to claim 2 for producing the sheeted tape having the adjusted width;

laminating the sheeted tape; and producing the fiber reinforced plastic by curing the resin included in the sheeted tape which has been laminated.

10. A method of molding a composite material comprising:

using the fiber width adjustment device according to claim 3 for producing the sheeted tape having the adjusted width;

laminating the sheeted tape; and producing the fiber reinforced plastic by curing the resin included in the sheeted tape which has been laminated.

* * * * *